(12) United States Patent
Eng

(10) Patent No.: US 11,168,562 B2
(45) Date of Patent: Nov. 9, 2021

(54) APPARATUS AND METHOD FOR PERFORMING FORMATION STRESS TESTING IN AN OPENHOLE SECTION OF A BOREHOLE

(71) Applicant: qWave AS, Stavanger (NO)

(72) Inventor: Hans Petter Eng, Stavanger (NO)

(73) Assignee: qWave AS, Stavanger (NO)

( * ) Notice: Subject to any disclaimer, the term of this patent is extended or adjusted under 35 U.S.C. 154(b) by 0 days.

(21) Appl. No.: 17/265,279

(22) PCT Filed: Sep. 27, 2019

(86) PCT No.: PCT/NO2019/050197
§ 371 (c)(1),
(2) Date: Feb. 2, 2021

(87) PCT Pub. No.: WO2020/071918
PCT Pub. Date: Apr. 9, 2020

(65) Prior Publication Data
US 2021/0246782 A1  Aug. 12, 2021

(30) Foreign Application Priority Data
Oct. 4, 2018 (NO) .................................. 20181282

(51) Int. Cl.
*E21B 49/00* (2006.01)
*E21B 47/06* (2012.01)
(Continued)

(52) U.S. Cl.
CPC ............ *E21B 49/006* (2013.01); *E21B 47/06* (2013.01); *E21B 49/081* (2013.01);
(Continued)

(58) Field of Classification Search
CPC ...... E21B 49/006; E21B 47/06; E21B 49/081; G01L 13/00; G01V 1/50; G01V 1/133;
(Continued)

(56) References Cited

U.S. PATENT DOCUMENTS 5,353,637 A   10/1994 Plumb et al.
9,200,507 B2 * 12/2015 Dorovsky ............... E21B 43/26
(Continued)

FOREIGN PATENT DOCUMENTS

| CA | 2889226 | 10/2015 |
|---|---|---|
| WO | 98/42948 | 10/1998 |
| WO | 2017/160158 | 9/2017 |

OTHER PUBLICATIONS

Norwegian Search Report for NO 20181282, dated May 3, 2019.
(Continued)

*Primary Examiner* — Ian J Lobo
(74) *Attorney, Agent, or Firm* — Andrus Intellectual Property Law, LLP

(57) ABSTRACT

A tool assembly and method are for performing formation stress testing in an openhole section of a borehole, wherein the openhole section of the borehole is to be provided with, or already have been provided with, a perforation tunnel generated by a series of electrically induced focused acoustic shock waves. The tool assembly has at least two borehole isolation means arranged with an axial distance therebetween for forming an isolated section at the openhole section of the borehole; a pump device for altering a pressure within the isolated section; a pressure sensor for measuring a pressure within the isolated section; a control unit for controlling a testing sequence; an acoustic shock wave device for generating the series of acoustic shock waves to excavate the perforation tunnel; and an acoustic shock wave sub for actuating the acoustic shock wave device.

17 Claims, 9 Drawing Sheets

(51) Int. Cl.
　　*G01V 1/50* (2006.01)
　　*E21B 49/08* (2006.01)
　　*G01B 17/00* (2006.01)
　　*G01L 13/00* (2006.01)
　　*G01V 1/133* (2006.01)

(52) U.S. Cl.
　　CPC ............ *E21B 49/087* (2013.01); *G01B 17/00* (2013.01); *G01L 13/00* (2013.01); *G01V 1/133* (2013.01); *G01V 1/50* (2013.01); *G01V 2210/121* (2013.01); *G01V 2210/1299* (2013.01); *G01V 2210/1429* (2013.01); *G01V 2210/62* (2013.01)

(58) Field of Classification Search
　　CPC ..... G01V 2210/1299; G01V 2210/121; G01V 2210/1429; G01V 2210/62; G01B 17/00
　　See application file for complete search history.

(56) References Cited

U.S. PATENT DOCUMENTS

| | | | |
|---|---|---|---|
| 2003/0213591 A1* | 11/2003 | Kuchuk | E21B 49/087 166/250.02 |
| 2011/0068787 A1 | 3/2011 | Freedman et al. | |
| 2012/0111559 A1* | 5/2012 | Deady | E21B 49/006 166/250.1 |
| 2012/0279713 A1 | 11/2012 | Leon et al. | |
| 2013/0000399 A1* | 1/2013 | Lilly | E21B 47/017 73/152.58 |
| 2013/0161007 A1 | 6/2013 | Wolfe et al. | |
| 2014/0305877 A1 | 10/2014 | Cioanta et al. | |
| 2015/0308233 A1 | 10/2015 | Parker et al. | |
| 2016/0130940 A1* | 5/2016 | Hsu | E21B 49/10 702/11 |
| 2019/0234162 A1* | 8/2019 | Barker | E21B 43/1195 |

OTHER PUBLICATIONS

International Search Report and the Written Opinion for PCT/NO2019/050197, dated Dec. 17, 2019.
Response to the Written Opinion for PCT/NO2019/050197, dated Aug. 4, 2020.
International Preliminary Report on Patentability for PCT/NO2019/050197, dated Sep. 29, 2020.
Shen-Min Liang et al.: "Biomedical Engineering Applications, Basis & Communications", vol. 18, 2006, article "Design and Fabrication of a Shock Wave Generator for Musculoskeletal Disorders", pp. 24-29.
"MDT Modular Formation Dynamics Tester", Schlumberger, SMP-5124, Jun. 2002 (Jun. 1, 2002), Retrieved from the Internet <https://www.slb.com/~/media/Files/evaluation/brochures/wireline_open_hole/insitu_fluid/mdt_brochure.pdf>.
Axel Haecker; Othmar Wess, "The role of focal size in extracorporeal shock wave lithotripsy", 2009, ISBN 978-81-308-0365-4.
Robin. O. Cleveland; James A. McAteer: "Smith's Textbook of Endourology", 2012, article "Chapter 49—Physics of Shock-Wave Lithotripsy".
Y. Fengj. F. Jonesk. E. Gray: "A Review on Fracture-Initiation and-Propagation Pressures for Lost Circulation and Wellbore Strengthening", SPE Drilling & Completion, vol. 31, No. 02, May 2016 (May 1, 2016).
A. C. Decnop Coelho: "Utilizing Mini-DST for Formation Evaluation", SPE Latin American And Caribbean Petroleum Engineering Conference, Jun. 20, 2005 (Jun. 20, 2005).

* cited by examiner

APPARATUS AND METHOD FOR PERFORMING FORMATION STRESS TESTING IN AN OPENHOLE SECTION OF A BOREHOLE

CROSS-REFERENCE TO RELATED APPLICATIONS

This application is the U.S. national stage application of International Application PCT/NO2019/050197, filed Sep. 27, 2019, which international application was published on Apr. 9, 2020, as International Publication WO 2020/071918 in the English language. The International Application claims priority of Norwegian Patent Application No. 20181282, filed Oct. 4, 2018. The international application and Norwegian application are both incorporated herein by reference, in entirety.

FIELD

The invention relates to a tool assembly for performing formation stress testing in an openhole section of a borehole. More specifically, the invention relates to a tool assembly for obtaining more reliable formation stress test results and performing the testing using conventional packers. The invention also relates to methods using such a tool assembly for the determination of other subterranean formation parameters.

BACKGROUND

Drilling mud is used during conventional subterranean borehole drilling operations. The drilling mud serves to balance formation pressures while drilling, to ensure safe and stable boreholes, as well as to carry drilling cuttings to the surface and cooling of the drilling bit. The drilling mud also serves to form a fluid/pressure barrier on the borehole wall to prevent loss of the drilling mud into a permeable formation. Although this intentionally imposed fluid/pressure barrier is a critical element during the drilling operation, it is also known to impose a negative effect on the formation with respect to later borehole operations. This negative effect is commonly referred to as drilling-induced formation damage, and may very coarsely be divided into two categories: 1) internal mudcake or solids invasion zone, which is a thin, low-permeable zone caused by solids from the drilling mud having bridged across the pore-throats of the formation, and typically extending a few millimetres to a few centimetres from the borehole wall and into the formation, and 2) a filtrate invasion zone, which is a zone largely consisting of filtrate from the drilling mud (such as water, oil, polymers etc.) having displaced the virgin formation fluid during the drilling operation, and typically extending a few centimetres to several tens of centimetres from the borehole wall and into the formation. Noting however that the boundaries between the different zones of the drilling-induced formation damage are not necessarily sharp and exact in space, thus the different zones may transition into one another and be gradually shifting, and their negative effect, e.g. the degree of fluid/pressure barrier imposed by the solids invasion zone, as well as their areal and lateral extent into the formation, may vary greatly with type of formation (e.g. its permeability) and the quality/composition/design of the drilling mud.

Determining subterranean formation parameters in an openhole section of a borehole, such as minimum in-situ stress, also known as fracture closure pressure (FCP), requires formation testing in the form of an openhole formation stress test, e.g. an openhole minifrac test. The conventional method for obtaining the minimum in-situ stress parameter may include a tool with two packers, e.g. straddle packers, a pump, for creating hydraulic pressurisation forces, and a pressure sensor. The tool for obtaining the minimum in-situ stress parameter may be a modified modular formation dynamics tester (MDT) tool. A crucial part of this test is to overcome a formation breakdown pressure (FBP). The FBP is a so-called system response affected by a combination of factors such as in-situ stresses, tensile strength of the formation, near wellbore (i.e. borehole) stresses and the previously mentioned drilling-induced formation damage (when the formation is permeable). The near wellbore stresses and drilling-induced formation damage may result in the FBP being significantly higher than the FCP. If the FBP is too high, conventional openhole stress testing methods may be rendered useless. The reason being that the straddle packers usually employed in these tests are unable to hold the necessary differential pressure (i.e. the difference in pressure in the borehole above or below the packers, and the pressure within an isolated section between the straddle packers) required to overcome the FBP, and consequently start to leak before the FBP is reached. This in turn may result in the period of the test for determining the FCP is never reached using such tool.

Determination of other subterranean formation parameters in an openhole section of a borehole, such as effective permeability and formation deliverability, requires formation testing in the form of an openhole pressure transient test, e.g. an openhole mini drill stem test (mini-DST). The conventional method for obtaining the effective permeability and/or formation deliverability parameters may include a tool with two packers, e.g. straddle packers, a pump, for creating suction forces, and a pressure sensor. The tool for obtaining the effective permeability and/or formation delivery parameters may be a modified MDT tool. However, especially in the case of low-permeability formations, the previously mentioned drilling-induced formation damage may make it time consuming, challenging or in some cases even impossible to perform a successful openhole pressure transient test using such tool.

Determination of other subterranean parameters in an openhole section of a borehole, such as fluid type/properties and formation pressure (i.e. pore pressure), requires formation testing of the formation, e.g. an openhole formation fluid sampling and/or formation pressure test. Conventional methods for obtaining the fluid type/properties and/or formation pressure parameters may include the use of a conventional MDT tool, or, as may be the case for low-permeability formations, the use of a modified MDT tool with larger size pad(s)/probe(s) or a straddle packer configuration. However, especially in the case of low-permeability formations, the previously mentioned drilling-induced formation damage may make it time consuming, challenging or in some cases even impossible to perform a successful openhole formation fluid sampling and/or formation pressure test using such tool(s).

The determination of formation pressure may also be performed in combination with the openhole formation stress test and/or the openhole pressure transient test and does not necessarily need to be performed in combination with the openhole formation fluid sampling test.

SUMMARY

The invention has for its general object to remedy or to reduce at least one of the drawbacks of the prior art, or at least provide a useful alternative to prior art.

One specific object of the invention is to provide a tool assembly and method for improved openhole formation stress testing.

Another specific object of the invention is to provide a tool assembly and method for improved openhole pressure transient testing.

A further specific object of the invention is to provide a tool assembly and method for improved openhole formation fluid sampling and/or formation pressure testing.

U.S. Pat. No. 5,353,637 discloses a modular sonde for measurements in open and cased boreholes. The sonde is conveyed on electric wireline with or without a coiled tubing for conveying hydraulic energy from the surface. Various disclosed configurations of the sonde have a stress/rheology module suited to the borehole situation.

U.S. 2014/0305877 A1 discloses methods and devices to generate acoustic shock waves for various applications within the oil and gas industry, such as by means of acoustic shock waves generated by the use of laser sources.

U.S. 2013/0161007 A1 discloses a pulse detonation tool for fracturing subterranean formations by means of supersonic shock waves.

U.S. 2012/279713 A1 discloses a method for inducing acoustic energy, in a non-shock wave state, into a downhole formation for stimulating the recovery of oil from the formation.

The objects are achieved through features, which are specified in the description below and in the claims that follow.

The invention is defined by the independent patent claims. The dependent claims define advantageous embodiments of the invention.

The FBP of a formation is a system response that is in part affected by near wellbore stresses. Further to this, the near wellbore stresses are known to gradually decrease in concentration with increasing distance away from the borehole wall. During the hydraulic pressurisation stage, of permeable formations, there is typically a point whereby the hydraulic pressurisation liquid (e.g. filtrated drilling mud) starts to leak into the formation (called leak-off pressure—$LOP_1$, also known as fracture initiation pressure). This leak may aid in reducing the FBP due to the previously mentioned fact that near wellbore stresses are known to gradually decrease in concentration with increasing distance away from the borehole wall. However, if the formation being tested is impermeable (e.g. cap rock of shale), or the formation has been severely affected by drilling-induced formation damage (e.g. an absolute or near-absolute fluid/pressure barrier has been imposed by the solids invasion zone), then the $LOP_1$ will be similar or identical to the FBP, resulting in a higher FBP than would have been the case if the hydraulic pressurisation liquid had been allowed to enter into the formation. Reference is made to article "*A Review on Fracture-Initiation and -Propagation Pressures for Lost Circulation and Wellbore Strengthening*", Y. Feng, J. F. Jones and K. E. Gray, SPE Drilling & Completion 31(02), May 2016, for a detailed review of relevant parameters and terms such as "fracture initiation pressure", "leak-off pressure" and "formation breakdown pressure", and what affects them.

The applicant has come to realise that prior to openhole formation stress testing, open-hole pressure transient testing, and/or openhole fluid sampling and/or formation pressure testing, a perforation tunnel extending from the borehole wall and into the formation may be created. The perforation tunnel extending into an area with decreasing near wellbore stresses, as well as, for the case of permeable formations, establishing and/or enhancing a fluid/pressure communication path into or past an area having been affected by the previously mentioned drilling-induced formation damage.

Following from the explanation above, when performing the openhole formation stress test of a tight/impermeable formation, such as cap rock (e.g. shale), the perforation tunnel may have the effect of introducing the hydraulic pressurisation liquid at an area with reduced near wellbore stresses (e.g. at the tip/distal end of the perforation tunnel), and hence reducing the "original" FBP to a new and lower "effective-FBP". Additionally, as may be the case when performing the openhole formation stress test of a permeable formation, the perforation tunnel may have the added effect of it establishing and/or enhancing the fluid/pressure communication path across the previously mentioned solids invasion zone, enabling and/or allowing ease for the hydraulic pressurisation liquid to flow across it and into the formation. This way, a new and lower effective-FBP may be established, which may enable use of conventional borehole isolation means, such as straddle packers, during the openhole formation stress test.

When performing the openhole pressure transient test, especially in the case of low-permeability formations, the perforation tunnel may have the effect of establishing and/or enhancing a fluid/pressure communication path across the previously mentioned solids invasion zone. This way, the openhole pressure transient test may be performed, which may otherwise have been challenging or impossible due to the absolute or near-absolute fluid/pressure barrier that may have been imposed by the previously mentioned solids invasion zone. For an in-depth disclosure of the use of mini-DST for formation evaluation, reference is made to the following article: "*Utilizing Mini-DST for Formation Evaluation*", A. C. DecnopCoelho et. al., presented at SPE Latin American and Caribbean Petroleum Engineering Conference, 20-23 Jun. 2005, Rio de Janeiro, Brazil, with document id SPE-94963-MS.

Similarly, when performing the openhole fluid sampling and/or formation pressure test, especially in the case of low-permeability formations, the perforation tunnel may have the effect of: 1) establishing and/or enhancing the fluid/pressure communication path across the previously mentioned solids invasion zone, allowing for performing the openhole fluid sampling and/or formation pressure test which may otherwise have been challenging or impossible due to the absolute or near-absolute fluid/pressure barrier that may have been imposed by the previously mentioned solids invasion zone, and/or 2) establishing a preferred "path of flow" for the clean/virgin formation fluid resulting in the circulation time required to acquire a clean/uncontaminated formation fluid sample may be significantly reduced. Reference is made to article: "*MDT Modular Formation Dynamics Tester*", Schlumberger, SMP-5124, June 2002, https://www.slb.com/~/media/Files/evaluation/brochures/wireline_open_hole/insitu_fluid/mdt_brochure.pdf, for a detailed overview of a conventional MDT tool as well as various ad-on modules required for different types of formation testing (i.e. turning the conventional MDT tool into a modified MDT tool), such as a fluid contamination analyser module required for formation fluid sampling, and procedures thereof.

The applicant has further realised that one particularly beneficial way of generating the perforation tunnels is by way of a series of electrically induced focused acoustic shock waves.

A shock wave field is a spatial and temporal distribution of acoustic energy within a three-dimensional space and time. It is characterized by basic parameters such as peak pressure and temporal behaviour of the pressure at different spatial positions within the field. The shock waves' forward-directed momentum, in the direction of its propagation, and its concentration in time are two main factors determining the effect of the shock wave. Another important factor being the feature of focusing the spatial pressure field, i.e. its concentration in space, by conserving and focusing the energy to a restricted area, as opposed to more radial or spherical propagation of the pressure field. The dynamic effect, for the most part, occurs at interfaces with a change in the acoustic impedance, such as when a shock wave propagating in a borehole liquid impact on a borehole wall. Also implying that a shock wave propagating in a borehole liquid, while simultaneously being enclosed by matter of different acoustic impedance than the borehole liquid, such as a formation surrounding a perforation tunnel, the shock wave will conserve a great deal of its energy for a long distance, only to be released at the interface with a change in acoustic impedance in the direction of the shock wave propagation, such as the tip/distal end of the perforation tunnel.

Reference is made to WO2017160158 disclosing a device and a method for generating and controlling such focused acoustic shock waves, as well as a detailed description of how the perforation tunnel may be generated, to which reference is made for an in-depth disclosure. The device comprising an electronically induced acoustic shock wave generator and an acoustic shock wave focusing member, hereinafter collectively referred to as an acoustic shock wave device, adapted to generate a series of acoustic shock waves, focused onto an area of a borehole wall with sufficient power density to disintegrate a formation within the area, to gradually excavate a perforation tunnel extending from the borehole wall and into the formation.

It should be noted that the actual power density required to disintegrate a formation will vary greatly from one formation type to another. However, typically the acoustic shock wave device should be adapted to generate acoustic shock wave pressure pulses with a magnitude in the range of 5-150 MPa within the focus area and with a rise time typically less than a micro second. Reference is made to article *"The role of focal size in extracorporeal shock wave lithotripsy"*, Axel Haecker and Othmar Wess, 2009, ISBN: 978-81-308-0365-4, for a detailed review of the importance of the peak pressure, as well as the spatial and temporal distribution of the pressure field, on kidney stone fragmentation efficiency (read: formation disintegration efficiency) of a shock wave field.

In a first aspect, the invention relates to a tool assembly for performing formation stress testing in an openhole section of a borehole, wherein the openhole section of the borehole is to be provided with, or already have been provided with, a perforation tunnel generated by means of a series of electrically induced focused acoustic shock waves, the tool assembly comprising:
  at least two borehole isolation means arranged with an axial distance therebetween for forming an isolated section at the openhole section of the borehole;
  an acoustic shock wave device adapted to generate the series of electrically induced focused acoustic shock waves in order to excavate the perforation tunnel, the acoustic shock wave device preferably being located between the borehole isolation means;
  a pump device adapted to be in fluid communication with the isolated section, wherein the pump device is configured to alter a pressure within the isolated section;
  an acoustic shock wave sub for actuating the acoustic shock wave device;
  a pressure sensor arranged for measuring a pressure within the isolated section; and
  a control unit to control a testing sequence, e.g. configured to receive information from the pressure sensor and to control the pump device.

It should be understood that by the acoustic shock wave device being "adapted to generate a series of electrically induced focused acoustic shock waves in order to excavate the perforation tunnel" is meant various ways to assemble, configure, power and control an interconnected shock wave generation system typically comprising the shock wave sub, the high voltage coaxial cable and the acoustic shock wave device, as a whole, to exercise the necessary focus and energy output, i.e. power density, required to disintegrate a formation within an area of a borehole wall. Ways to adapt involves and depends on factors such as amount of energy available (i.e. size of the capacitor bank within the acoustic shock wave sub, involving factors such as voltage and/or capacitance, typically being in the range of 30-300 joule), type and quality of the discharge control unit, type and quality of the high voltage coaxial cable, the overall inductance and equivalent series resistance ("ESR") of the shock wave generation system as a whole, type of discharge fluid, and/or distance between the tips of the electrodes, type of focus (e.g. collimated or concentrated), type of acoustic shock wave focusing member (e.g. flat, elliptic or parabolic), type of acoustic shock wave generator (e.g. electrohydraulic, piezoelectric or electromagnetic source), distance between the aperture of the shock wave device and borehole wall, type of formation, and/or time to complete and desired size/length of the perforation tunnel.

One example of such adaption may involve the use of an electrohydraulic source acoustic shock wave generator by way of two electrodes that are axially aligned with a relatively small spacing between the tips of the electrodes, and with the centre of the spacing between the tips of the electrodes located at the first focal point (F1) of an acoustic shock wave focusing member shaped as a half ellipsoid. When actuated, the shock waves will then be concentrated/converging towards the second focal point (F2) of a full ellipsoid shape (i.e. point of theoretical power density maximum, hence preferred location of the borehole wall). Further adaption may then involve the steps of: 1) prior to lowering the tool assembly into the borehole, hard fixing into the body of the tool assembly the acoustic shock wave device, with the elliptic shaped acoustic shock wave focusing member having semi-major and semi-minor axes giving a (F2−F1)/2 significantly equal a pre-calculated distance between the aperture of the acoustic shock wave device and the borehole wall, and/or, 2) attaching an acoustic shock wave device, with an elliptic shaped acoustic shock wave focusing member with desired semi-major and semi-minor axes, onto an acoustic shock wave device module allowing for lateral movement of the acoustic shock wave device, e.g. in the form of a hydraulic actuator, allowing for use of same design/configuration acoustic shock wave device in boreholes with varying diameter (lateral movement to such extent that the known (F2−F1)/2 of the half ellipsoid shaped acoustic shock wave focusing member is significantly equal the at all time distance between the aperture of the acoustic shock wave device and the borehole wall(s)). The latter may also prove advantageous, now in the form of lateral adaption or change in depth focus, in the way that the F2 may be shifted laterally for improved excavation efficiency as the perforation tunnel is excavated deeper and deeper into the formation. As a further means for adaption, the energy output exerted by the acoustic shock wave generator (or indirectly as provided by an acoustic shock wave sub), e.g. adjusting the charging voltage of a capacitor with a given capacitance, may be controlled/adjusted depending on factors such as the distance between the aperture of the shock wave device and a borehole wall, type of formation, time to complete and desired size/length of the perforation tunnel, and/or as a means to compensate for any reduction in acoustic energy output due to any increase in gap distance between the tips of the electrodes (due to erosion of the electrodes during operation). Reference is made to "*Chapter 49—Physics of Shock-Wave Lithotripsy*", Robin. O. Cleveland and James A. McAteer, Smith's Textbook of Endourology 3$^{rd}$ Edition, 2012, for a detailed review of the fundamentals of shock wave generation, delivery and control.

In one embodiment the acoustic shock wave device may be fitted with a controllable spark gap system, including means for manual and/or automatic adjustment of the gap distance between the tips of the electrodes, e.g. axially adjustable electrodes by means of one or more electrical motor(s). Reference is given to article "*Design and Fabrication of a Shock Wave Generator for Musculoskeletal Disorders*", Shen-Min Liang et al., Biomedical Engineering Applications, Basis & Communications, 2006, 18:24-29, for an example for such controllable spark gap system and a detailed review of the effect of electrode gap distance on acoustic energy output by use of the electrohydraulic principle.

Reference is made to CA2889226 for a detailed description of system/component design for the powering and control of an acoustic shock wave device, and how such a series of electronically induced acoustic shock waves may be generated.

It should also be understood that by "borehole" or "borehole wall" is also meant any external mudcake present with varying degree of thickness and density on the exterior of the borehole wall. A person skilled in the art will understand that an external mudcake will typically be generated as a residue in drilling operations when a slurry, such as a drilling mud, is forced against a permeable medium under pressure. The external mudcake as such will normally be less dense, and thus more easily disintegrated, than the formation, by the focused acoustic shock waves.

In one embodiment, the tool assembly may further comprise a logic unit configured to receive information from a pressure sensor and based on the information, determine a subterranean formation parameter, such as a minimum in-situ stress, an effective permeability, a formation deliverability and/or a formation pressure, whereby the process of determining the formation parameter(s) may be fully or at least partially automated. A further advantage of including a logic unit is that data from the pressure sensors may be received and transferred to the surface for real time monitoring. As an alternative or in addition to real-time transfer, data may also be stored for retrieval and interpretation once the tool assembly is back at the surface. In an alternative embodiment, where the tool assembly does not include such a logic unit, the process of obtaining the formation parameter(s) may simply be based on manual control and interpretation of data from topside. In another embodiment the logic unit may be used to control the pump device and/or other components of the tool assembly, such as valve(s), independently and/or as part of an automatically predefined formation testing sequence.

In one embodiment, the tool assembly may further comprise one or more isolating pressure barriers. The isolating pressure barriers may make it possible to keep sensitive electronic components, such as a DC-DC converter, a logic unit, an acoustic shock wave sub etc., under near atmospheric conditions, which may be advantageous for such components to properly work/function under hostile downhole conditions.

A borehole may have a varying diameter along the length of the borehole. Not only as a result from having used drilling bits of different sizes while drilling the different intervals of the borehole (i.e. bit-size interval), but the borehole diameter may also vary within each bit-size interval due to formation breakouts that may have been caused by the drilling operation itself and/or other borehole stability issues. Following from this, in one embodiment, the tool assembly may further comprise a device for measuring the true inner diameter of the borehole, for, indirectly, determining/controlling a distance between an aperture of an acoustic shock wave device and the borehole wall, and/or for the purpose of real-time monitoring of a performance/progression of a gradual perforation tunnel excavation process. The device for measuring the true inner diameter of the borehole may e.g. be a multi-finger calliper, or in a more sophisticated embodiment, an acoustic transmitter and receiver. The lateral position of the aperture of an acoustic shock wave device relative to the wall of the borehole (i.e. the true distance between the two), and/or relative to the at all time tip/distal end of the perforation tunnel, may be accurately obtained by means of the device for determining the true inner diameter of a borehole (by knowing both the true location in space of the aperture of the acoustic shock wave device and a point on the borehole wall and/or the at all time tip/distal end of the perforation tunnel). Knowing the accurate lateral position of the aperture of the acoustic shock wave device relative to the borehole wall may be advantageous to maximize the disintegration effect/process of the shock waves on the formation, as previously discussed in detail. The device for measuring the true inner diameter of the borehole may also be useful for locating previously excavated perforation tunnel(s). In another embodiment, the device for measuring the true inner diameter of the borehole may be a formation imaging device suitable for imaging the borehole in 360°, such as the Ultrasonic Borehole Imager (BHI) commercially available from Schlumberger Ltd. In another embodiment, the device for measuring true inner diameter of the borehole may consist of a radar, such as nanoscale impulse radar sensors, a laser operating in a low power mode, a downhole camera or similar.

In one embodiment, the acoustic shock wave device may be laterally movable relative to the tool assembly, i.e. in a radial direction relative to the length axis of the tool assembly. As discussed above, a borehole may have a varying diameter along the length of the borehole. Following from this, enabling radial/lateral movement of the acoustic shock wave device may have the advantage of keeping an essentially constant distance between the aperture of the acoustic shock wave device and the borehole wall in all sections of the borehole, if so desired. Additionally, during the gradual excavation process of a perforation tunnel as per this invention, radial/lateral movement of the acoustic shock wave device a distance essentially equal to the excavated depth of the perforation tunnel may have the advantage of maintaining the focus at the point or area where the disintegration of the formation is to take place, i.e. the at all time tip/distal end of the perforation tunnel, whereby the efficiency of the excavation process may be improved and the time to complete a perforation tunnel with desired size/length may be reduced.

In one embodiment the acoustic shock wave device may at least be partially covered by a flexible membrane. The flexible membrane may be particularly useful when the acoustic shock wave device includes an elliptically or parabolically shaped acoustic shock wave focusing member and an electrohydraulic source acoustic shock wave generator, as the flexible membrane may contribute to enclosing the acoustic shock wave device, typically by covering an aperture of the acoustic shock wave device, in order to maintain a controlled discharge liquid environment within the void of the acoustic shock wave focusing member. The flexible membrane may have the advantage of enabling efficiency, control and reproducibility of the energy characteristics of the electrohydraulic source acoustic shock wave generator (i.e. control of the discharge liquid present therein), as well as to prevent deposits, debris and/or other elements from the surrounding environment (i.e. the borehole liquid) from damaging the electrodes and/or other components (e.g. insulators) within the void of the acoustic shock wave focusing member. The flexibility of the membrane may ensure smooth transfer of acoustic energy past the membrane without substantial absorption and/or refraction of energy therein. The flexible membrane may be made from a material comprising a thermoplastic polyurethane class material (e.g. polyether or polyester, or a mixture of the two). The flexible membrane may further in a preferred embodiment be formed with an acoustic impedance typically in the range of 1.0-3.0 MRayl, or even more preferably essentially equal to, the acoustic impedance of the discharge liquid inside the void of the acoustic shock wave focusing member and/or the borehole liquid, the borehole liquid typically consisting of crude oil and/or water and/or drilling mud, which may further ensure smooth transfer of acoustic energy through the discharge liquid inside the void of the acoustic shock wave member, past the membrane and further through the borehole liquid in order to maximize the amount of acoustic energy released at the focus area where the formation is to be disintegrated. In a preferred embodiment, for improved efficiency and control of the electrohydraulic source acoustic shock wave generator (i.e. improved electrohydraulic effect), the discharge liquid is of a slightly ionized (e.g. NaCl) water type, with electrical conductivity in the range of 400-1000 microS/cm. In another embodiment the discharge liquid is of an at least partly degassed/deoxidized type (i.e. <8 mg $O_2$/L).

In one embodiment, the pump device may, in addition to being able to alter the pressure within the isolated section, also be adapted to engage/disengage (i.e. inflate/deflate) the borehole isolation means into/out of contact with the borehole wall so as to form/undo the isolated section. By adapting the pump device to handle multiple purposes, the size of the tool assembly may be reduced, as compared to having a dedicated pump device for engaging and/or disengaging the borehole isolation means. Such compactness of the tool assembly may be particularly advantageous as space in boreholes is usually limited. A way to adapt such multiple purposes pump device may be to connect and operate the pump device via a hydraulic diverter, such as a two- or three-way diverter valve, which may be further adapted to be in hydraulic communication with the borehole isolation means through dedicated hydraulic line(s). In the same way, and for the same reasons, the pump device may also be adapted to enable the previously mentioned radial/lateral movement of the acoustic shock wave device.

In one embodiment, the tool assembly may further comprise at least one additional pressure sensor arranged outside the isolated section. The additional sensor(s) enable(s) measuring/monitoring a pressure outside the isolated section of the borehole. In combination, the information from the sensor(s) inside and outside the isolated section may be used to determine a pressure differential across the borehole isolation means. This information may also be advantageous for the identification/detection of any unwanted fluid/pressure leak between the isolated section and the outside of the isolated section of the borehole. In another embodiment, additional pressure sensor(s) may be arranged within an isolation mean(s) so as to measure/monitor the pressure therein. Such additional pressure sensor(s) arranged within the isolation mean(s) may be particularly advantageous as care should be taken, when engaging (i.e. pressurising) the borehole isolation means, but also during the later period of pressurising of the isolated section (as indirectly, as, due to the normally flexible/compressible nature of the borehole isolation means (e.g. straddle packers) such pressurisation within the isolated section may cause further increase of the pressure within the borehole isolation means), so that the pressure/expansion forces exerted by the borehole isolation means on the borehole wall does not cause the formation to fracture. Such fracturing of the formation is undesired as it may lead to fluid/pressure leakage past the borehole isolation means, meaning a successful openhole formation stress test may not be conducted.

In one embodiment, the tool assembly may further comprise a pressure bleed-off system for controllably reducing an overbalanced pressure condition within the isolated section, wherein the pressure bleed-off system comprises a valve (mechanically/electrically operated, e.g. a solenoid type valve that may be operable by means of the control unit of the tool assembly) arranged on the tool assembly between the borehole isolation means, the valve being in fluid communication with a first portion of a housing arranged within the tool assembly, the housing being provided with a piston displaceable within the housing, wherein a second portion of the housing is in liquid communication with a nozzle (with preset/known orifice size, variable/interchangeable) arranged on the tool assembly outside of the isolated section, the piston separating the first portion and the second portion of the housing and the second portion comprising a clean and essentially incompressible liquid, such as oil or water, wherein the nozzle is configured to control a flow of the liquid from the second portion. When performing openhole formation stress testing, a significant overbalanced pressure condition may be established in the isolated section (i.e. during the pump-on period of the testing sequence). When performing openhole formation stress testing of permeable formations, when the pump device is stopped (i.e. during the pump-off period of the testing sequence) this overbalanced pressure will naturally deplete/defuse into the permeable formation (i.e. during the fracture closure and determination of the minimum in-situ stress period, and/or the formation pressure measurement period, of the testing sequence). However, when performing openhole formation stress testing of impermeable formations, such as cap rock, this overbalanced pressure has no natural way to escape/deplete/defuse. Then, to be able to bleed-off the overbalanced pressure condition within the isolated section, and hence allowing the continuation of the testing sequence, the liquid within it must be diverted out of the isolated section in a controlled way. A controlled way to do this is by way of the pressure bleed-off system. As the liquid present within the isolated section may contain particles and debris, and its flowing properties (such as viscosity) may be unknown, it may be difficult (because of the unknown viscosity) or even impossible (due to partly or full clogging of the nozzle) to, in a controlled way, bleed-off the overbalanced pressure present within the isolated section through a nozzle directly. The pressure bleed-off system may however allow for a controlled bleed-off of the overbalanced pressure within the isolated section as the fluid is diverted into the housing, set to displace the piston that in turn displaces the clean and essentially incompressible liquid through the port/nozzle arranged on the tool assembly outside of the isolated section and into the annulus of the borehole above or below the borehole isolation means. Thus, the liquid exiting the tool assembly is a of a known, clean substance that allows for better control of the flow and less risk of plugging the port/nozzle.

By "testing sequence" is meant the pump-on/pump-off period exerted by the pump unit, a single pump-on/pump-off or pump-off/pump-on interval per sequence or multiple pump-on/pump-off or pump-off/pump-on intervals per sequence. By "testing sequence" is also meant the controlling of other components of the tool assembly, such as valve(s) and a fluid contamination analyser module, and as otherwise would be typical when performing formation stress testing, pressure transient testing and/or formation fluid sampling and/or formation pressure testing, and as will be understood by a person skilled in the art.

In one embodiment, the tool assembly may further comprise a bypass channel configured to create and/or maintain fluid/pressure communication between two sections of the borehole separated by the borehole isolation means and the isolated section. The bypass channel may allow a fluid, such as mud, present in the borehole to flow between a section of the borehole above the upper borehole isolation means and a section of the borehole below the lower borehole isolation means. The bypass channel may allow the fluid to flow in both directions.

When engaging the borehole isolation means to create the isolated section, the section of the borehole located below the lower borehole isolation means becomes isolated from the rest of the borehole. After some time, the fluid in the borehole below the lower borehole isolation means may start to leak into the formation, leaving a void with no fluid in the borehole directly below the lower borehole isolation means. This may reduce the pressure/buoyancy forces acting on the lower borehole isolation means, or in some cases, the flow of liquid will be reversed, increasing the pressure/buoyancy forces acting on the lower borehole isolation means. In either case, the difference in pressure/buoyancy acting on the borehole isolation means may increase the axial load on the borehole isolation means, causing the tool assembly to become unstable. This may in turn create unwanted movement of the tool assembly caused by a gradual slipping of the borehole isolation means or vibration effects due to the tool assembly being under tension, which may yield poor formation testing results, especially when performing an openhole formation stress test. Having a bypass channel through the tool assembly may therefore allow pressure and buoyancy equilibrium on both sides of the isolated section of the tool assembly, improving the quality and reliability of test results. Such a bypass channel may also facilitate run-in or pull-out of the tool assembly into or out from the borehole by allowing fluid in the borehole to partly flow through the bypass channel and thereby reduce drag and/or pull forces on the tool assembly and/or a cable head and/or a borehole conveying means. The bypass channel may be of the type which is always open, such as a continuous pipe or flowline, allowing free fluid/pressure communication between the section of the borehole above the upper borehole isolation means and the section of the borehole below a lower borehole isolation means, or it could be of a more advanced/controllable fluid bypass system, including one or more valve(s), such as a check valve. The one or more valves may be purely automatic and operate in response to flow and pressure conditions and/or one or more of the valves may be operable by means of the control unit of the tool assembly so as to regulate opening and closing of the valve independently of flow and pressure conditions.

In one embodiment, the tool assembly may comprise an anchoring means, in addition to or as an alternative the borehole isolation means (read: as may act as anchoring means on their own), such as one or more laterally displaceable hydraulic arms, pods or similar. In another embodiment the anchoring means may be one or more downhole tractor(s).

In one embodiment, the tool assembly may be axially rotated as a whole, i.e. 0° to 360° around the length axis of the tool assembly. This may be achieved e.g. by way of activation of an axially rotatable downhole tractor prior to engaging the borehole isolation means and/or any anchoring means. In another embodiment, the tool assembly may comprise a rotatable connection means for 0° to 360° axial rotation such that an entire portion of the tool assembly arranged below or above the connection may be axially rotated relatively and independently of the other part/portion of the tool assembly which may be held firmly in place by the borehole isolation means and/or the anchoring means. In another embodiment, the tool assembly may comprise two or more rotatable connection means for 0° to 360° axial rotation such that the parts(s)/portion(s) of the tool assembly arranged outside/between the rotatable connection means may be axially rotated relatively and independently of the other part(s)/portion(s) of the tool assembly which may be held firmly in place by the borehole isolation means and/or the anchoring means. In a particularly advantageous embodiment, the section of the tool assembly between the borehole isolation means comprising the acoustic shock wave device module may be 0° to 360° axially rotatable relative and independent to the borehole isolation means, implying that multiple perforation tunnels may be excavated consecutively by the axial rotation of the acoustic shock wave device relative to the length axis of the tool assembly, or such that the perforation tunnel(s) may be excavated in one or more specific/preferred direction(s), e.g. essentially in parallel to the direction of maximum in-situ stress, without the need for disengage/re-engage of the borehole isolation means. Following from the above, the rotatable connection means may be in the form of a swivel type connection, properly fitted with components such as gear(s), bearing(s) and/or o-ring(s), and where its driving mechanism may be in the form of an integrated electrical motor with gear, and/or an externally fitted device such as an downhole tractor, allowing for the 0° to 360° axial rotation.

In one embodiment, the tool assembly may further comprise a fluid contamination and sampling system in selective fluid communication with the isolated section via ports with in-line filters, or pad(s)/probe(s) in direct contact with a formation in the openhole section of a borehole, as may be the case when used in combination with conventional or modified MDT tool. The fluid contamination and sampling system may comprise a fluid contamination analyser circuit including a fluid contamination analyser module. The fluid contamination and sampling system may further comprise a valve for activating/re-directing the flow of formation fluid to pass through the fluid contamination analyser module when the pump device is set in suction mode (i.e. creating an underbalanced pressure condition within the isolated section). The valve may be mechanically and/or /electrically operated, e.g. a solenoid type valve. The fluid contamination analyser module may be configured to analyse a fluid coming from within the isolated section, and to analyse its contamination level. The fluid may be circulated through the fluid contamination analyser module, by the way of and through the pump device, and discarded into an annulus of the borehole above or below a borehole isolation means until a satisfactory fluid quality level is monitored by the fluid contamination analyser module (read: until the fluid contamination level, i.e. degree of impurities in the formation fluid caused by the drilling operation, or other operations in the borehole, is below a certain criteria). The fluid contamination and sampling system may further comprise a pressure-tight container for storing a formation fluid sample, and another set of valves, opened for a temporary re-direct of the fluid flow through the pressure-tight container and ultimately sealing (i.e. closing of the valves) of the fluid sample therein, and brought to the surface for laboratory analysis and determination of fluid type/properties. The valves may be mechanically and/or electrically operated, e.g. a solenoid type valve. Alternatively, a more conventional fluid contamination and sampling system, e.g. a MDT-LFA (live fluid analyser) module and a MDT-MRSC (modular sample chamber) module by Schlumberger Ltd., or similar, may be used instead.

In one embodiment, the tool assembly may comprise connection means adapted to form a connection to a borehole conveying means. The borehole conveying means may be a wireline, a slickline or a fluid carrying string/pipe such as a coiled tubing and other types of work strings and drill strings. The borehole conveying means may be adapted to transfer energy and signal communication between the surface to the tool assembly. Preferably, the signal communication may be bi-directional. The energy transfer may be in the form of electric, typically DC, but may also be AC and/or hydraulic power. It may also be in the form of laser energy transmitted from the surface. It should also be mentioned that the tool assembly may carry its own power source and/or generator as an addition or alternative to the supply from the surface. The downhole power source and/or generator may be in the form of batteries and/or downhole motors, such as downhole mud motors. The actual conveyance may be actuated from the surface by operating the conveyance means (e.g. by way of a wireline unit) and/or by means of a downhole tractor.

In one embodiment, the tool assembly may further comprise a directional sensor unit configured to measure an orientation of the tool assembly in a horizontal plane and an inclination in a vertical plane, whereby it may be possible to at all time have knowledge of the spatial xyz-position and orientation of the acoustic shock wave device in the borehole. One particular advantage of including such directional sensor unit may be to have the knowledge and/or ensuring (by ways of this invention, and as previously discussed) that the perforation tunnel is generated in a certain/preferred direction in space, e.g. essentially in parallel to the direction of a maximum in-situ stress of the formation (if known). The directional sensor unit may typically include one or more accelerometers and/or one or more magnetometers and/or optionally one or more gyroscopes.

It should also be mentioned that a tool assembly according to the first aspect of the present invention may also comprise a number of different tools/modules not necessarily mentioned herein, some of which will be mentioned or repeated in the following; a guide assembly, a cable head, an electronic power unit, a roller section, a swivel, a blank pipe section, a centraliser, a multi-finger caliper, various formation logging/imaging devices or tools, a vertical positioning section, a directional sensor unit, an actuator, an electrical motor, a wireline formation tester, a flow control module, a fluid analyser, a fluid sample chamber, a downhole tractor (rotational and/or longitudinal), a control unit, a logical unit, a pressure bleed-off circuit and also means for anchoring the tool assembly in the borehole.

It should also be mentioned that a tool assembly according to the first aspect of the invention may comprise a plurality of acoustic shock wave devices that may be adapted to simultaneously or consecutively generate a plurality of perforation tunnels from the borehole wall and into the adjacent formation.

In a second aspect the invention relates to a method for performing formation stress testing, pressure transient testing and/or formation fluid sampling and/or formation pressure testing in an openhole section of a borehole using a tool assembly, wherein the tool assembly comprises at least two borehole isolation means, an acoustic shock wave device, an acoustic shock wave sub for actuating the acoustic shock wave device, a pump device and a pressure sensor arranged for measuring a pressure within an isolated section to be formed between the two borehole isolation means, the method comprising the steps of:

positioning the tool assembly at a desired section of the borehole;

forming the isolated section by means of the borehole isolation means;

gradually excavating a perforation tunnel into the formation by means of a series of electrically induced focused acoustic shock waves generated by way of the acoustic shock wave device or locating an already excavated perforation tunnel;

operating the pump device to alter the pressure within the isolated section in accordance with a testing sequence;

collecting and/or storing data from the pressure sensor between the borehole isolation means; and using the data collected from the pressure sensor data to determine a subterranean formation parameter.

It should be noted that the step of forming the isolated section by engaging the borehole isolation means may be initiated after the excavating or locating the perforation tunnel. In certain embodiments, as already discussed above, the tool assembly may be provided with anchoring means other than the borehole isolation means. It should also be noted that engaging the borehole isolation means may be done by inflating the isolating means in the form of packers. However, in alternative embodiments such engaging may include mechanical and/or electrical engaging of packers as will be understood by a person skilled in the art.

In one embodiment, wherein the tool assembly further comprises a fluid contamination and sampling system in selective fluid communication with the isolated section, the method may further comprise the steps of:

opening a valve to establish a fluid communication between the isolated section and a fluid contamination analyser circuit;

operating the pump device to create an underbalanced pressure condition within the isolated section; and when analyses show contamination at an acceptable level, opening a set of valves for collecting a formation fluid sample and storing the sample in a pressure-tight container.

In another embodiment, the method may further include the steps of:
performing an openhole pressure transient test by operating the pump device in accordance with a testing sequence while simultaneously measuring the pressure within the isolated section in order to determine a subterranean formation property such as:
effective permeability; and
formation deliverability.

BRIEF DESCRIPTION OF THE DRAWINGS

In the following are described examples of preferred embodiments illustrated in the accompanying drawings, wherein.

DETAILED DESCRIPTION OF THE DRAWINGS

Figure 1:
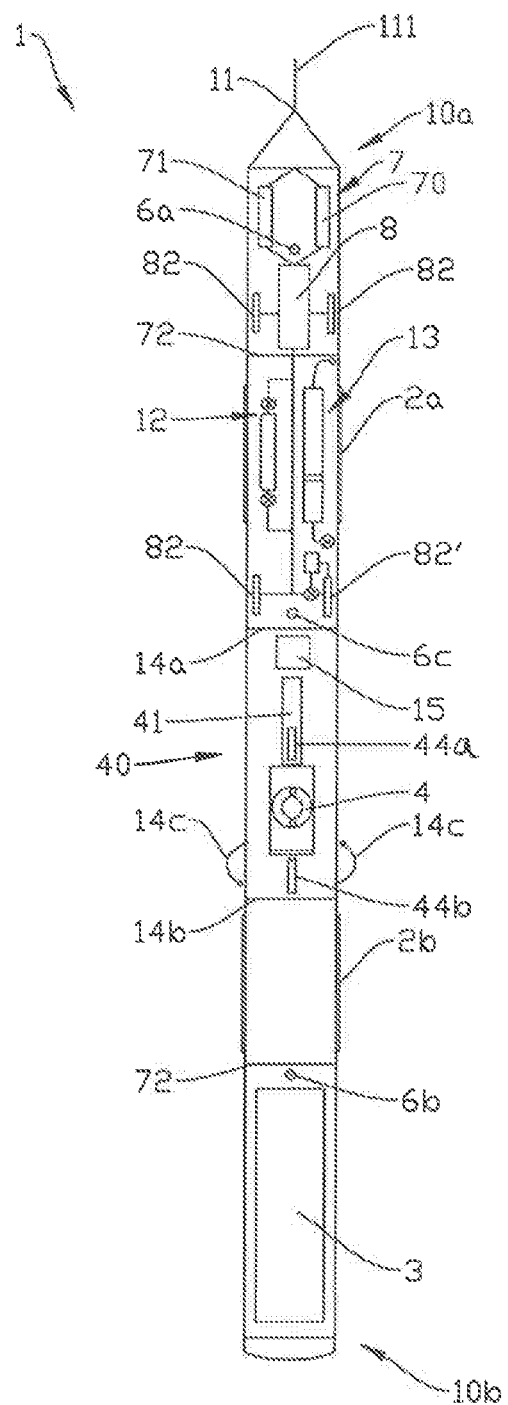
FIG. 1 shows one embodiment of a tool assembly according to the invention.

In the following, the reference numeral 1 will indicate a tool assembly according to the first aspect of present invention. Identical reference numerals will be used to indicate identical or similar features in the drawings. The drawings are shown highly simplified and schematically and the various features therein are not necessarily drawn to scale.

Figure 4:
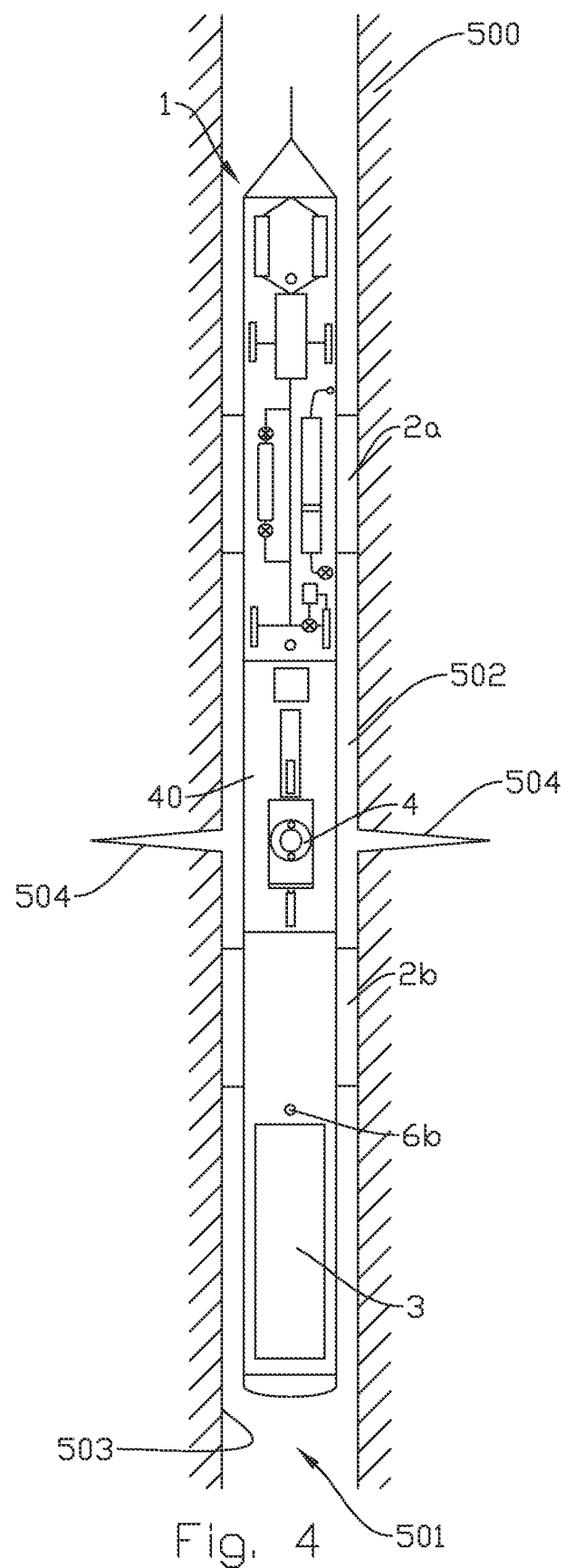
FIG. 4 shows the tool assembly located in a borehole.

FIG. 1 shows a tool assembly 1 according to the first aspect of the present invention comprising two borehole isolation means 2a, 2b in the form of inflatable packers; an upper packer 2a and a lower packer 2b, both shown in a disengaged/deflated mode. It should be understood that "lower" and "upper" refer to a position relative to a free end portion 10b of the tool assembly 1. The free end portion 10b being directed towards, in operational use, a bottom of a borehole 501, as shown in FIG. 4.

The tool assembly 1 in the shown embodiment is adapted to convert, store/accumulate and discharge power received from the surface by means of an acoustic shock wave sub 3, the acoustic shock wave sub 3 typically including electrical components such as a transformer, capacitor(s) or other accumulators, and a discharge control unit (trigger/switch, automatic or manually triggered from the surface) to "power" (actuate) an acoustic shock wave device 4. The acoustic shock wave sub 3 is shown to be located between the lower packer 2b and the free end portion 10b of the tool assembly 1. The acoustic shock wave sub 3 may however be located elsewhere in the tool assembly 1 in other embodiments. The acoustic shock wave device 4 is located between the upper packer 2a and the lower packer 2b. In other embodiments, the acoustic shock wave device 4 may however be located above the upper packer 2a or below the lower packer 2b. In one embodiment, the tool assembly 1 may comprise a plurality of acoustic shock wave devices 4, though only one is shown in the figure, located between the borehole isolation means 2a, 2b and/or above and/or below the borehole isolation means 2a, 2b. One advantage of locating the acoustic shock wave device 4 between the packers 2a, 2b is that a perforation tunnel 504, as shown in FIG. 4, may be excavated and followed by a formation test without having to reposition the tool assembly 1 to align the perforation tunnel 504 between the borehole isolation means 2a, 2b. This may have the advantages that the perforation tunnel may be generated in an underbalanced pressure condition (which may have the advantage of a more efficient excavation process and/or a cleaner perforation tunnel), that the perforation tunnel may be challenging to locate if having to reposition the tool assembly 1 following completion of the excavation process, and that repositioning of the tool assembly 1 may also lead to the generation of new drilling-induced formation damage in the time between the completion of the excavation process and the performance of the formation test. The acoustic shock wave sub 3 and the acoustic shock wave device 4 is connected by a high voltage, preferably coaxial cable 5, see FIG. 3a, for transfer of high voltage/power electric pulses from the acoustic shock wave sub 3 to the acoustic shock wave device 4. The tool assembly 1 is further shown to comprise three pressure sensors 6a, 6b, 6c. An upper pressure sensor 6a is positioned above the upper packer 2a, a lower pressure sensor 6b is positioned below the lower packer 2b and a middle pressure sensor 6c is positioned between the borehole isolation means 2a, 2b. The three pressure sensors 6a, 6b, 6c are configured to measure a pressure in the borehole and transmit the information to a control unit 7. The control unit 7 in the shown embodiment comprises a logic unit 70 such as a telemeter, wherein the telemeter comprises a telemetry configured to receive, collect and optimally also send, information, e.g. pressure data, to the surface for real-time processing and/or to automatically perform a formation test according to a set of predefined parameters/a predefined testing sequence. A DC-DC converter 71 is for accommodating incoming DC power, as provided from the surface by way of a borehole conveying means 111, and transforming it into suitable DC power/voltage level(s) for the powering of electronic components such as a pump device 8, the control unit 7, the acoustic shock wave sub 3 etc. The pump device 8 is in fluid connection with the borehole above the upper packer 2a via a port with in-line filter 82 (for inlet of filtered fluid, such as drilling mud, and/or for discarding of produced/waste fluid as discussed further below). The tool assembly 1 is further shown to comprise two isolating pressure barriers 72, one above the upper isolation member 2a and one below the lower isolation member 2b. The isolating pressure barriers 72 make it possible to keep sensitive electronic components, such as the DC-DC converter 71, the control unit 7, the acoustic shock wave sub 3 etc., under isolated atmospheric conditions, which may be advantageous for such components to properly work/function under hostile downhole condition.

The pump device 8 comprises a pump, e.g. a hydraulic pump (not shown), and a hydraulic diverter unit (not shown), the pump being driven by a DC motor (not shown). The pump device 8 is connected to the borehole isolation means 2a, 2b and a hydraulic actuator 41 in an acoustic shock wave device module 40, see FIGS. 2a and 2b, via a hydraulic communication line 80, see FIGS. 2a, 2b and 3a. The pump device 8 is configured to actuate, i.e. engage/disengage, the borehole isolation means 2a, 2b and actuate the hydraulic actuator 41. The pump 8 is also configured to create an overbalanced or underbalanced pressure condition within an isolated section 502 of the borehole between the borehole isolation means 2a, 2b via a second port with in-line filter 82, 82'.

A connection means 11 in the form of a cable head is arranged in a second end portion 10a of the tool assembly 1. The connector 11 is configured to connect the tool assembly 1 to the borehole conveying means 111, such as a wireline or coiled tubing, to convey the tool assembly 1 in or out of the borehole. The borehole conveying means 111 may comprise a downhole tractor (not shown) configured to push or pull the tool assembly 1 along the borehole 501, see FIG. 4. This is particularly relevant for deviated or horizontal boreholes 501. Optionally, the downhole tractor may also be adapted to rotate the tool assembly 1 around its axial direction.

Figure 2A:
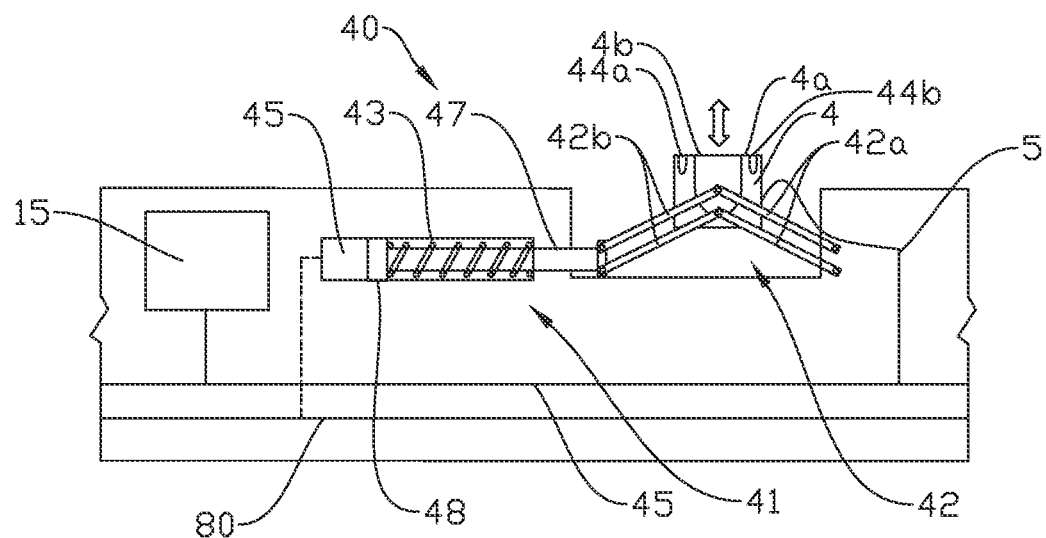
FIG. 2a shows one embodiment of an acoustic shock wave device module adapted to be included in a tool assembly according to the invention.

FIG. 2a shows one embodiment of an acoustic shock wave device module 40 comprising a hydraulic actuator 41 further including a hydraulic cylinder 45 and a spring 43. A piston rod 47 of the hydraulic cylinder 45 is connected to a hinge mechanism 42 holding the acoustic shock wave device 4. The hinge mechanism 42 comprises a first pair of hinge arms 42a and a second pair of hinge arms 42b, wherein a first, distal end of each arm in the pair of hinge arms 42a, 42b is hinged to the acoustic shock wave device 4. A second, proximal end of each arm in the second pair of arms 42b is hinged to the piston rod 47 and mounted within the housing of the acoustic shock wave module 40. A second, proximal end of each arm in the first pair of arms 42a is hinged to the housing of the acoustic shock wave module 40. Thus, when stroking the piston rod 47, the second, proximal end of each arm in the second pair of arms 42b will slide relative to the housing of the acoustic shock wave module 40 and rotated the hinge arms 42a, 42b such that the acoustic shock wave device 4 is displaced laterally relative to the housing of the acoustic shock wave module 40, i.e. in a radial direction relative to the length axis of the tool assembly 1. In one embodiment, the acoustic shock wave module 40 includes of two hydraulic actuators 41 (the second hydraulic actuator 41 not shown), one on each side of the acoustic shock wave device, which would make for a straight lateral movement. A flexible membrane 4b covers the aperture of the acoustic shock wave device 4 as was discussed in further detail above. In the acoustic shock wave device module 40, the spring 43 functions as a fail-safe mechanism. The fail-safe mechanism, which is a tension spring in the shown embodiment, exerts an increasing biasing force on the piston rod 47 when stroking outwards such that if hydraulic pressure is lost, the spring 43 will stroke the piston rod 47 inwards, and thus retract the acoustic shock wave device 4 into the housing of the acoustic shock wave module 40 in a protected and non-extended position. In a simpler, not shown embodiment the acoustic shock wave device 4 may be hard fixed into the housing of the acoustic shock wave device module 40 without the ability for lateral displacement/movement of the acoustic shock wave device 4 relative to the length axis of the tool assembly 1.

Figure 2B:
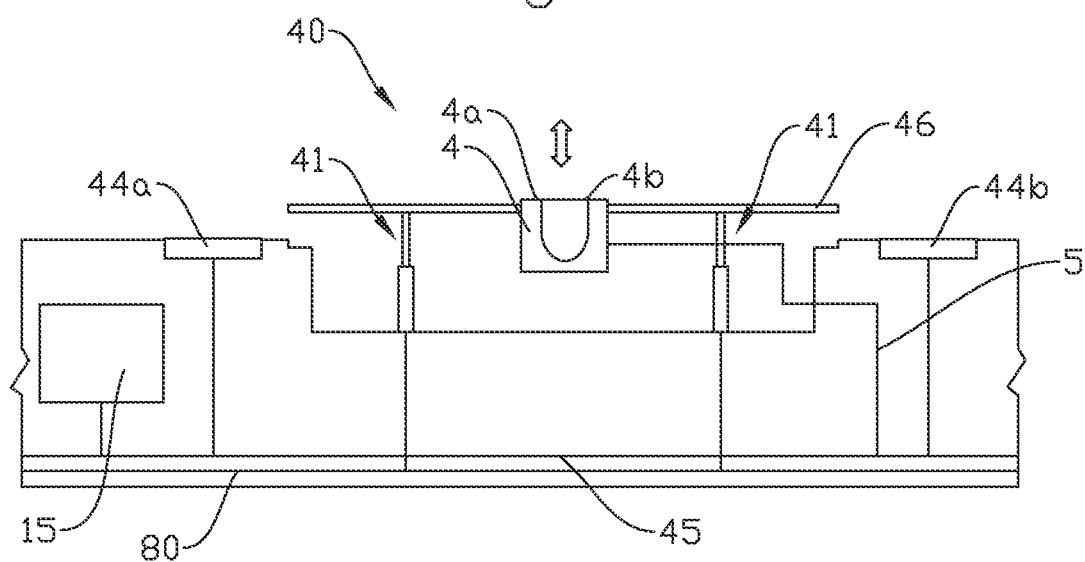
FIG. 2b shows another embodiment of an acoustic shock wave device module adapted to be included in a tool assembly according to the invention.

FIG. 2b shows another embodiment of the acoustic shock wave device module 40, wherein the acoustic shock wave device 4 is connected to a carrier 46, the carrier 46 being laterally displaceable by means of the two, linear hydraulic actuators 41. When the cylinder rods of the hydraulic actuators 41 are in a non-extended position, the carrier 46 will be flush with the housing of the acoustic shock wave module 40, whereas when the cylinder rods extend, i.e. move outwardly from the housing of the acoustic shock wave module 40, the carrier 46 with acoustic shock wave device 4 is moved laterally towards the not shown wall of the borehole. The carrier 46 and/or hydraulic actuator 41 may also in this embodiment be provided with a not shown fail-safe mechanism, such as a tension spring, intended to move the carrier 46 back into a non-extended position upon loss of hydraulic power. Similarly to the embodiment of FIG. 2a, the aperture of the acoustic shock wave device 4 is covered by a flexible membrane 4b as was discussed in further detail above. FIGS. 2a and 2b further show two embodiments of an acoustic transmitter 44a and an acoustic receiver 44b for measuring the true inner diameter of the borehole at the location of interest (i.e. the area where the perforation tunnel is to be excavated). In the embodiment of FIG. 2a, the acoustic transmitter 44a and the acoustic receiver 44b are arranged on a rim portion 4a of the aperture of the acoustic shock wave device 4. In the embodiment of FIG. 2b, the acoustic transmitter 44a and the acoustic receiver 44b are arranged on the housing of the acoustic shock wave module 40 adjacent the acoustic shock wave device 4. In another, not shown embodiment the acoustic transmitter 44a and the acoustic receiver 44b are arranged at other locations on the acoustic shock wave device module 40 (e.g. at the opposite side relative to the location of the acoustic shock wave device 4), and/or they may be acting in combinations consisting of more than one acoustic transmitter 44a and one acoustic receiver 44b (e.g. acting in the combination of one acoustic transmitter and two or more acoustic receivers 44b). In another embodiment, the device for measuring true inner diameter of the borehole may consist of a radar, such as nanoscale impulse radar sensors, a laser operating in a low power mode, a downhole camera or similar. In a simpler, not shown embodiment the tool assembly may instead be provided with multi-finger calliper for measuring the true inner diameter of the borehole. The multi-finger calliper may be used in addition to or as an alternative to other devices measuring the true inner diameter of the borehole.

Figure 3A:
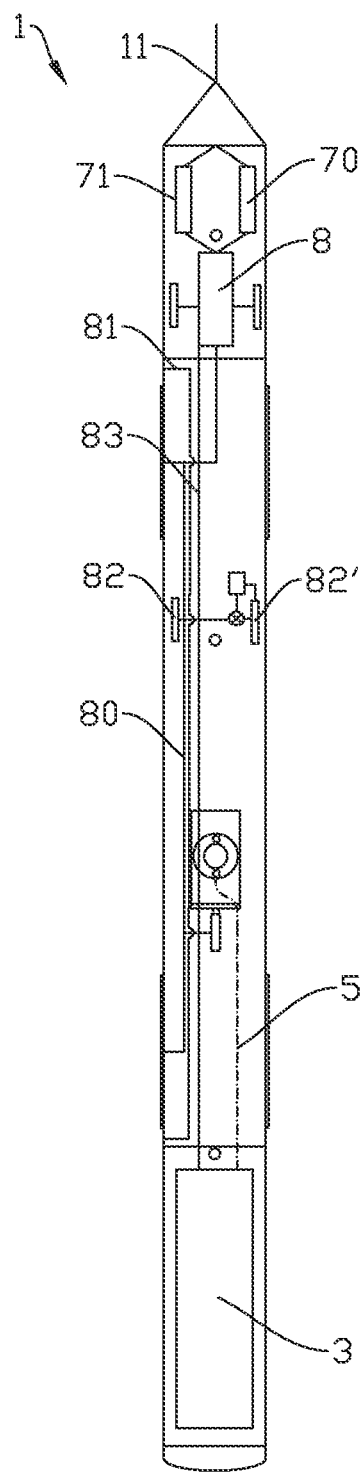
FIG. 3a shows another view of the tool assembly in FIG. 1.

FIG. 3a shows the tool assembly 1 with bypass channel 81 extending from above the upper packer 2a to below the lower packer 2b. The bypass channel 81 allows for fluid/pressure communication between a borehole section above the upper packer 2a and a borehole section below the lower packer 2b. Fluid, such as drilling mud, present in the borehole 501 may flow between the borehole sections via the bypass channel 81. Flow through the bypass channel 81 may be controlled by check valve(s) (not shown) arranged in either end(s) of the bypass channel 81. A relatively low voltage cable 83 extends through the length direction of the tool assembly 1 and connects the acoustic shock wave sub 3 to the DC-DC converter 71, the DC-DC converter 71 further being connected to the cable head 11/borehole conveying means 111. When engaging the borehole isolation means 2a, 2b to create the isolated section 502, the section of the borehole located below the lower packer 2b becomes isolated from the rest of the borehole 501. After some time, the fluid in the borehole below the lower packer 2b is known to start leaking into the formation 500, leaving a void with no fluid in the borehole 501 directly below the lower packer 2b. This may reduce the pressure/buoyancy forces acting on the lower packer 2b, or in some cases, the flow of liquid will be reversed, increasing the pressure/buoyancy forces acting on the lower packer 2b. In either case, the difference in pressure/buoyancy acting on the borehole isolation means 2a, 2b may increase the axial load on the borehole isolation means 2a, 2b, causing the tool assembly 1 to become unstable. This may in turn create unwanted movement of the tool assembly 1 caused by a gradual slipping of the borehole isolation means 2a, 2b or vibration effects due to the tool assembly 1 being under tension, which may yield poor formation testing results, especially when performing an openhole formation stress test. Having a bypass channel 81 through the tool assembly 1 may therefore allow pressure and buoyancy equilibrium on both sides of the isolated section 502 of the tool assembly 1, improving the quality and reliability of test results. Such a bypass channel 81 may also facilitate run-in or pull-out of the tool assembly 1 into or out from the borehole 501 by allowing fluid in the borehole 501 to partly flow through the bypass channel 81 and thereby reduce drag and/or pull forces on the tool assembly 1 and/or the cable head 11 and/or the borehole conveying means 111.

Figure 3B:
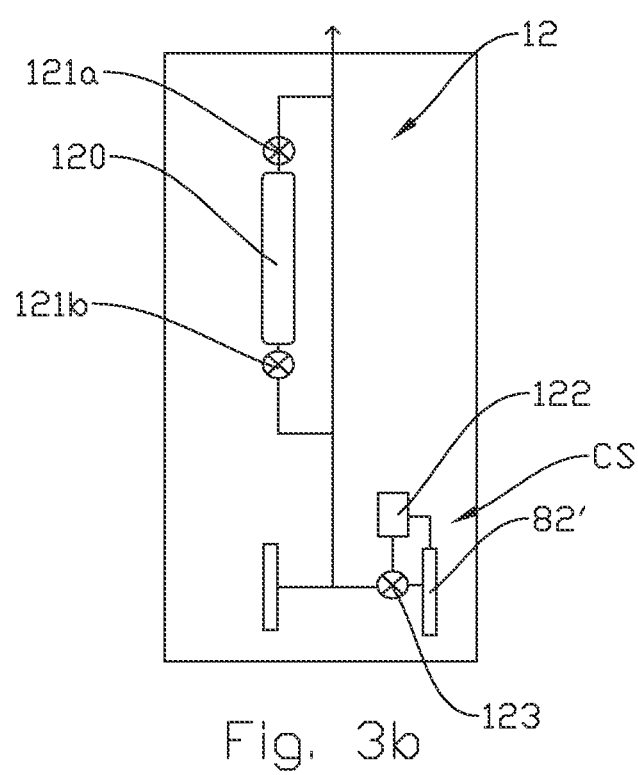
FIG. 3b shows one embodiment of a fluid contamination and sampling system adapted to be included in a tool assembly according to the invention.

FIG. 3b shows a fluid contamination and sampling system 12 in selective fluid communication with the isolated section 502 between the isolation means 2a, 2b via the port with in-line filter 82'. The fluid contamination and sampling system 12 comprises a fluid contamination analyser circuit CS including a fluid contamination analyser module 122. The fluid contamination and sampling system 12 further comprises a valve 123 for activating/re-directing the flow of formation fluid to pass through the fluid contamination analyser module 122 when the pump device 8 (not shown) is set in suction mode. The fluid contamination analyser module 122 is configured to analyse the formation fluid coming from within the isolated section 502, and to analyse its contamination level. The formation fluid will continue to be circulated through the fluid contamination analyser module 122, through the pump device 8 (not shown, but as indicated by the arrow at the top of the figure), and discarded into the annulus of the borehole above or below the borehole isolation means (not shown) until a satisfactory fluid quality level is monitored by the fluid contamination analyser module 122 (read: the fluid contamination level is below a certain criteria). The fluid contamination and sampling system 12 further comprises a pressure-tight container 120 for storing a formation fluid sample, and a set of valves 121a, 121b, then opened for a temporary re-direct of the fluid flow through the container 120 and ultimately sealing (i.e. closing of valves 121a, 121b) of the formation fluid sample therein.

Figure 3C:
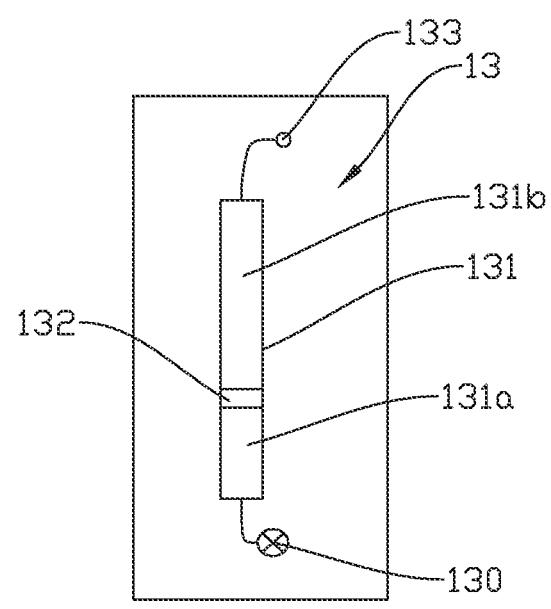
FIG. 3c shows one embodiment of a pressure bleed-off system adapted to be included in a tool assembly according to the invention.

FIG. 3c shows a pressure bleed-off system 13 for controllably reducing an overbalanced pressure condition within the isolation section 502, wherein the pressure bleed-off system 13 comprises a valve 130 arranged on the tool assembly 1 between the borehole isolation means 2a, 2b, the valve 130 being in fluid communication with a first portion 131a of a housing 131 arranged within the tool assembly 1, the housing 131 being provided with a piston 132 displaceable within the housing 131, wherein a second portion 131b of the housing 131 is in liquid communication with a nozzle 133 arranged on the tool assembly 1 above the upper packer 2a, the piston 132 separating the first portion 131a and the second portion 131b of the housing 131 and the second portion 131b comprising a clean and essentially incompressible liquid (with known flowing properties, such as viscosity), such as oil or water, wherein the nozzle 133 is configured to control a flow of the liquid from the second portion 131b. The pressure bleed-off system 13 may be of particularly advantage when performing openhole formation stress testing of impermeable formations 500, such as cap rock, as the overbalanced pressure imposed within the isolation section 502 would have no natural way to escape/deplete/defuse. Additionally, with the second portion 131b comprising a clean and essentially incompressible liquid (with known flowing properties), the pressure bleed-off system 13 will allow for a controlled depletion of the overbalanced pressure condition within the isolated section 502, with limited risk of the nozzle being clogged by particles and/or debris.

Now returning to FIG. 1, the tool assembly 1 is shown to be provided with two rotatable connection means 14a, 14b. The rotatable connection means 14a, 14b enabling axial rotation (marked with arrows 14c in FIG. 1) of the acoustic shock wave device module 40 comprising the acoustic shock wave device 4 relative to the length axis of a remainder of the tool assembly 1. Thus, the acoustic shock wave device 4 may be directed in any radial direction 0° to 360° relative to the length axis of the tool assembly 1. The selective radial direct of the acoustic shock wave device 4 may be of particularly advantage as it may allow for consecutive generation of multiple perforation tunnels (not shown) by the axial rotation of the acoustic shock wave device 4 relative to the length axis of the tool assembly 1, or such that the perforation tunnel(s) (not shown) may be excavated in one or more specific/preferred direction(s), without the need for disengage/re-engage of the borehole isolation means 2a, 2b. In one embodiment, the rotatable connection means 14a, 14b may be in the form of a swivel type connection (not shown), properly fitted with components such as gear(s), bearing(s) and/or o-ring(s) (neither of which are shown), and where its driving mechanism may be in the form of an electrical motor with gear (not shown) integrated within the body of the acoustic shock wave device module 40. In another embodiment, the radial rotation 14c may be achieved by way of an externally fitted device such as a downhole tractor (not shown). In yet another embodiment, the pump device 8 may be arranged to be in hydraulic communication (not shown) with the rotatable connection means 14a, 14b and configured to rotate the part of the acoustic shock wave device module 40 located between the rotatable connection means 14a, 14b.

Now returning to FIGS. 1, 2a and 2b, the acoustic shock wave device module 40 is shown to comprise a directional sensor unit 15. The directional sensor unit 15 is configured to measure an orientation of the tool assembly 1 in a horizontal plane and an inclination in a vertical plane, whereby it may be possible to at all time have knowledge of the spatial xyz-position and orientation of the acoustic shock wave device 4 in the borehole 501. One particular advantage of including such directional sensor unit 15 may be to have the knowledge and/or ensuring that the perforation tunnel 504, as shown in FIG. 4, is generated in a certain/preferred direction in space, e.g. essentially in parallel to the direction of a maximum in-situ stress of the formation (if known). The directional sensor unit 15 typically include one triaxial fluxgate magnetometer (not shown) and three accelerometers (not shown). The horizontal reference direction may be true north, and the vertical reference direction may be a plumb line. The directional sensor unit 15 is shown to be arranged within the housing of the acoustic shock wave device module 40, adjacent the acoustic shock wave device 4. This is the preferred position of the directional sensor unit 15 in the shown embodiment as the acoustic shock wave device module 40 may be rotated and it is the orientation of the acoustic shock wave device 4 that is of particular relevance when operating the tool assembly 1.

A subterranean formation 500 may comprise sections(s)/layer(s)/zone(s) with greatly varying properties. For example, an upper section of the formation 500 may include an area of cap rock (significantly tight/impermeable), while a lower section of the formation 500 may include one or more permeable zones.

FIG. 4 shows the tool assembly 1 positioned in an openhole section of a borehole 501. In the shown embodiment, both borehole isolation means 2a, 2b are in an inflated mode, thus forming the isolated section 502 therebetween.

Figure 5:
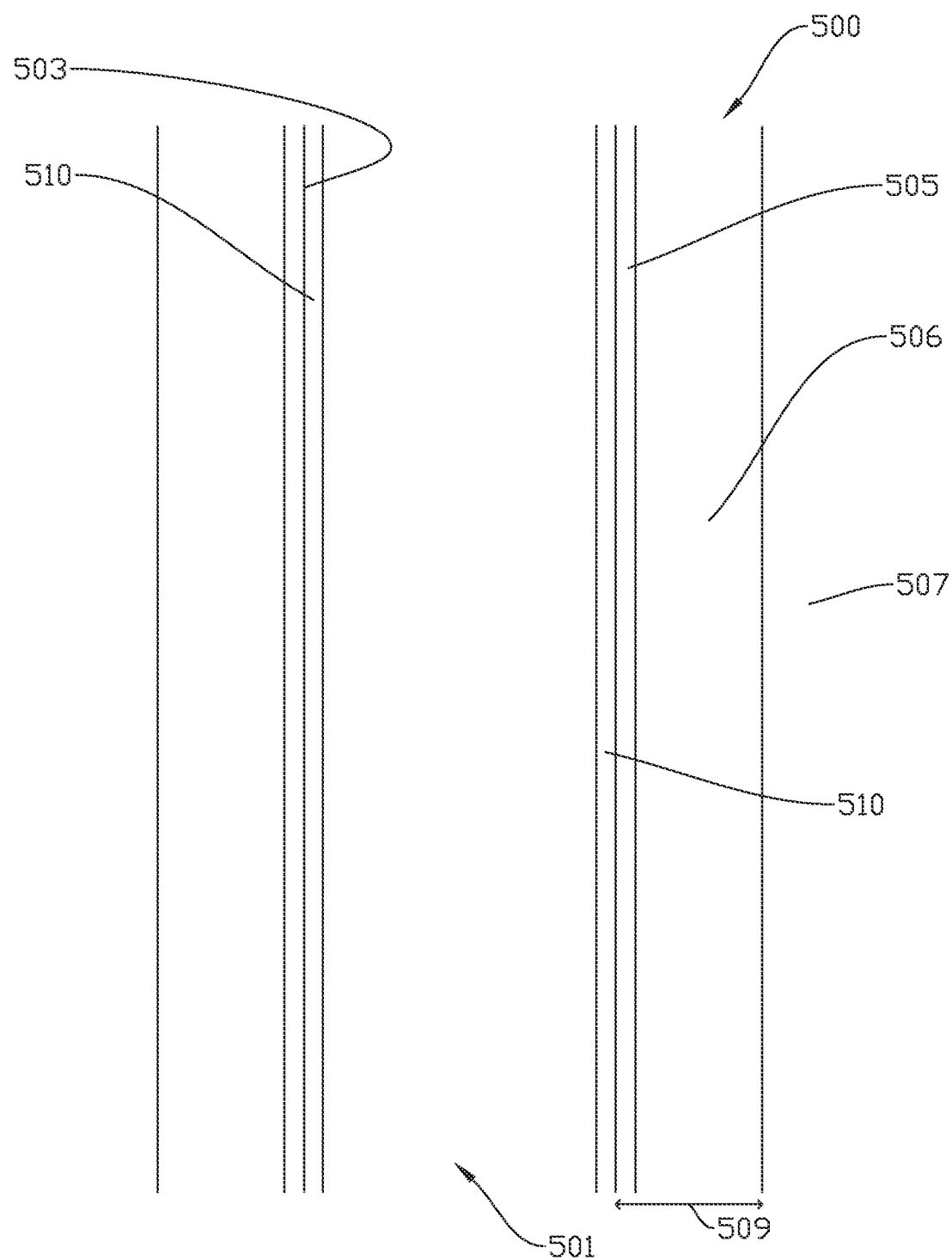
FIG. 5 shows a typical borehole with surrounding formation and drilling-induced formation damage zonation.

Reference will now be made to FIG. 5. When drilling a borehole 501, the area of a formation 500 near an inner borehole wall 503 of the borehole 501 may be affected by the drilling operation itself, and is collectively, commonly and herein, referred to as "drilling-induced formation damage". The areal and lateral extent of the formation 500 having been affected by the drilling-induced formation damage zone 509 may vary greatly with the type of formation 500 (e.g. its permeability) and the quality/composition/design of the drilling mud used during the drilling operation. Herein, we have referred to the zone nearest to the borehole wall 503, at the formation 500 side, and being the zone having been largely influenced/contaminated by solids from the drilling mud, as a solids invasion zone 505. The solids invasion zone 505 typically extends a few millimetres to a few centimetres into the drilling-induced formation damage zone 509. The zone outside the solids invasion zone 505, at the formation 500 side, and being the zone having been largely contaminated by filtrate from the drilling mud, is further referred to as a filtrate invasion zone 506. Further on, the zone outside the filtrate invasion zone 506, at the formation 500 side, is herein referred to as an uncontaminated zone 507 (i.e. the area of the formation 500 that has not been significantly contaminated by the filtrate from the drilling mud and hence largely contain "virgin" formation fluid). The drilling-induced formation damage zone 509, and in particular the solids invasion zone 505, is known to create a fluid/pressure barrier between the formation 500 and the borehole 501. This fluid/pressure barrier may cause challenges both for pressure transient testing and formation fluid sampling and/or formation pressure testing, as well as for formation stress testing (when the formation is permeable). The filtrate invasion zone 506 may further create challenges during formation fluid sampling. As shown in FIG. 5, the borehole 501 may also have been exposed with an external mud cake 510, as explained above. As also mentioned above, the boundaries between the different zones of the drilling-induced formation damage are not necessarily sharp and exact in space, thus the different zones may transition into one another and be gradually shifting.

Figure 6:
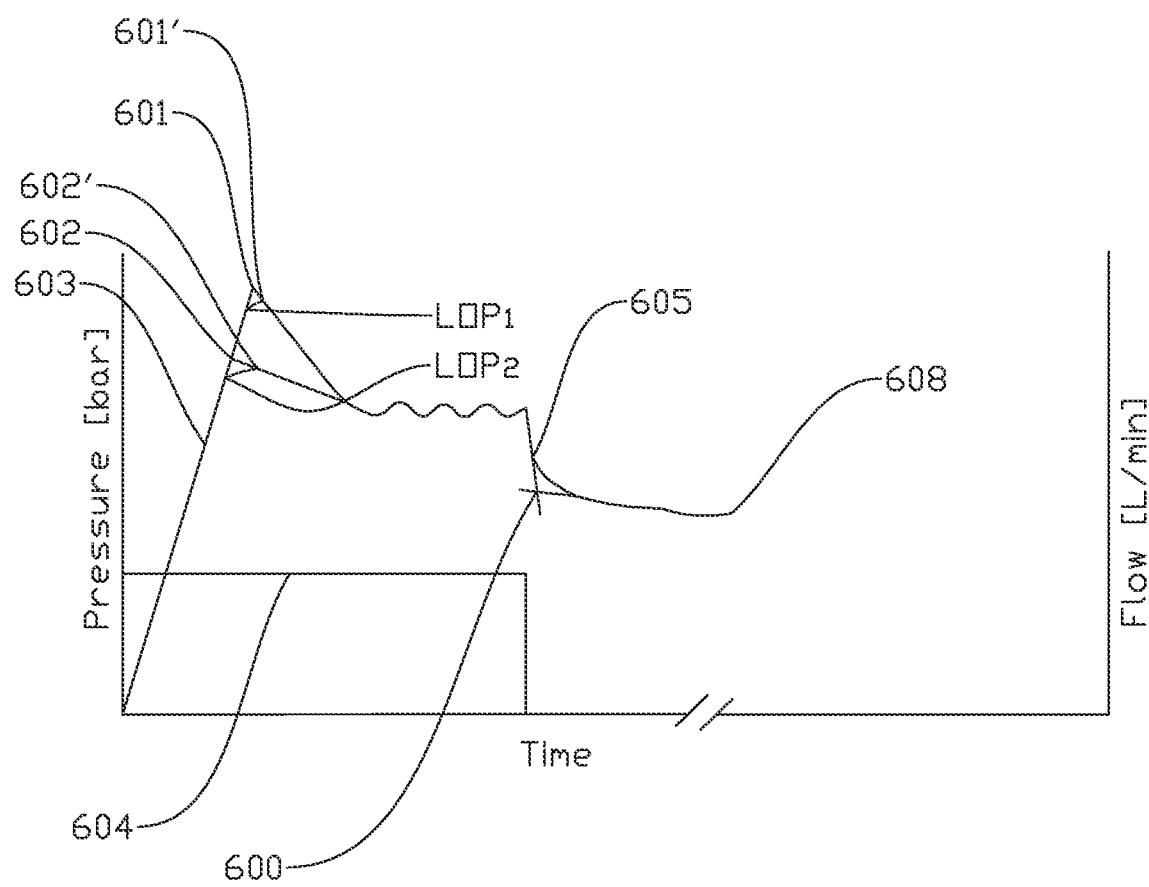
FIG. 6 shows a typical single cycle formation stress test flow rate vs. pressure vs. time testing sequence.
Figure 7:
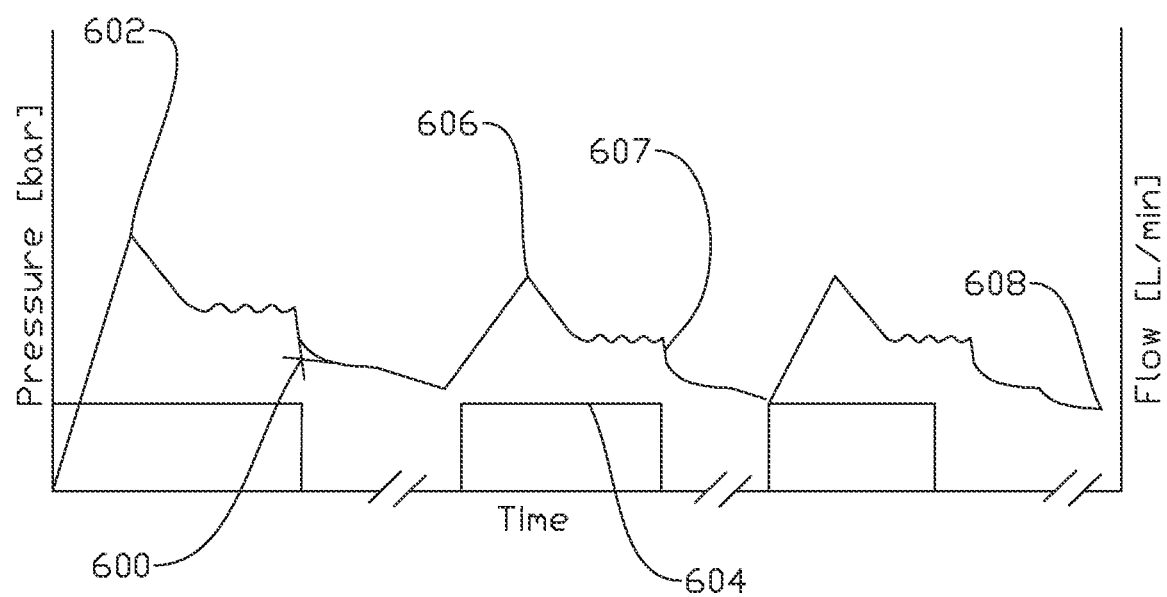
FIG. 7 shows a typical multi-cycle formation stress test flow rate vs. pressure vs. time testing sequence.

FIG. 6 shows a typical flow rate 604 vs. pressure 603 vs. time behaviour during a formation stress test of the formation 500, herein referred to as a single cycle formation stress test flow rate vs. pressure vs. time testing sequence. The objective of this formation stress test is to initiate and develop a relatively short fracture in the formation 500 (not shown), by exceeding the formation breakdown pressure (FBP) of the formation 500, and then to observe closure of the fracture during an ensuing pressure falloff period, for the purpose of determining a formation parameter such as the minimum in-situ stress and/or the formation pressure of the formation. The flow rate 604 (i.e. the hydraulic pressurisation liquid) may be provided by a pump device 8, and the pressure 603 may be measured by a pressure sensor 6c arranged between two borehole isolation means 2a, 2b. A pressure 603 within the isolated section 502 varies with the flow rate 604 and a propagation of the fracture in the formation. Simplified, it can be said that during the initial period of the formation stress test testing sequence, prior to the fracture having been initiated, the pressure 603 will increase until the point when FBP is reached. If the formation 500 is impermeable (such as cap rock), and/or an absolute fluid/pressure barrier has been imposed by the solids invasion zone 505, then the pressure 603 will increase essentially linearly all the way until the point when FBP is reached (indicated as 601 in FIG. 6). However, if the formation 500 is permeable, and the fluid/pressure barrier as imposed by the solids invasion zone 505 is not absolute, then the pressure (i.e. the hydraulic pressurisation liquid) may start to leak into the formation 500 at a point before FBP is reached. The pressure/point where this leak is initiated is called leak-off pressure (LOP), indicated as $LOP_1$ in FIG. 6. This leak of hydraulic pressurisation liquid into the formation may further have the advantage of a reduced FBP of the formation, indicated as 601' in FIG. 6. Further on, once the fracture is created, pressure 603 starts depreciating as the fracture continuous to evolve/propagate into the formation 500. At the end of the flow rate 604 period, an almost instantaneous drop in pressure is first observed, known as the instantaneous shut-in pressure (ISIP) 605, then followed by a more gradual drop in pressure as the fracture gradually closes. This is the part of the testing sequence where the fracture closure pressure (FCP) 600, i.e. the minimum in-situ stress of the formation, may be interpreted/determined by way of linear extrapolation. For more reliable results and to check consistency, multiple cycles may be run, as shown in FIG. 7. For the subsequent cycles, the flow rate 604 is re-established and the fracture re-opens at a certain pressure known as the fracture re-opening pressure 606. The pressure 603 depreciates as the fracture propagates into the formation 500 once more, until a new end of the flow rate 604 period is met, and consequently a new ISIP 607 and period of gradual drop in pressure is observed. Such multi-cycle test is herein referred to as a multi-cycle formation stress test flow rate vs. pressure vs. time testing sequence. In either of the two testing sequences, the period of the gradual drop in pressure may be continued for a period of time until near stabilisation of pressure is observed, which may be interpreted as the formation pressure 608 of the formation 500.

The period of ISIP 605, and the following period required for the determination of either the minimum in-situ stress 600 and/or the formation pressure 608, may however never be reached/be possible with conventional openhole stress testing methods/tools, due to a presently excessive FBP and the consequent fluid/pressure leak passed the conventional straddle packers, as was discussed in detail above. By first generating a perforation tunnel 504 in the formation by way of this invention, the perceived/effective formation breakdown pressure of the formation, and potentially also the leak-off pressure if the formation is permeable (indicated as $LOP_2$ in FIG. 6), may be significantly reduced, i.e. the initial excess pressure imposed by near wellbore stresses may be reduced, meaning that the stage of new, and lower, effective-FBP 602, or an even lower effective-FBP 602' (as may be the case when taking the reduced $LOP_2$ into consideration), and subsequently the period for determination of the minimum in-situ stress 600 and/or the formation pressure 608 may be reached, and determined, using conventional straddle packers.

Whereby the method for performing formation stress testing by way of this invention, typically comprising the steps of, after having positioned the tool assembly 1 at a desired section of the borehole 501, the borehole isolation means 2a, 2b are engaged, i.e. inflated, to form an insolate section 502 between the borehole isolation means 2a, 2b. The borehole wall 503 within the isolated section 502 may have previously been provided with a perforation tunnel 504, or a new perforation tunnel 504 may be generated. A previously generated perforation tunnel 504 may also be reopened and/or extended. The perforation tunnel 504 is generated, reopened and/or extended by directing the series of focused acoustic shock waves towards the borehole wall 503. In what follows, excavation will be used as a collective term for generating, reopening and extending the perforation tunnel 504.

During the excavation of the perforation tunnel 504, the pump device 8 may be used to create an underbalanced pressure condition within the isolated section 502 such that debris from the formation 500 may be cleaned out from the perforation tunnel 504. Maintaining an underbalanced pressure condition within the isolated section 502, even during the consecutive period of formation testing, such as openhole pressure transient testing and/or openhole formation fluid sampling and/or formation pressure testing, may also reduce the risk of "damaging" the formation 500, i.e. to introduce new drilling-induced formation damage. The lateral position of the acoustic shock wave device 4 may be adjusted by the acoustic shock wave device module 40 to maximise the excavation process/the energy transmitted by the acoustic shock wave device 4 onto the borehole wall 503. Once a perforation tunnel 504 is completed, the acoustic shock wave module 40 may be rotated to form another perforation tunnel 504 in a different direction if required without the need for disengage/re-engage of the borehole isolation means 2a, 2b.

Having excavated one or more perforation tunnel 504s, a formation test may commence as described above/below. Once the formation test has been completed, the process may be repeated at the same section of the borehole 501, and/or the tool assembly 1 may be repositioned to another section of the borehole 501 for further testing.

Figure 8:
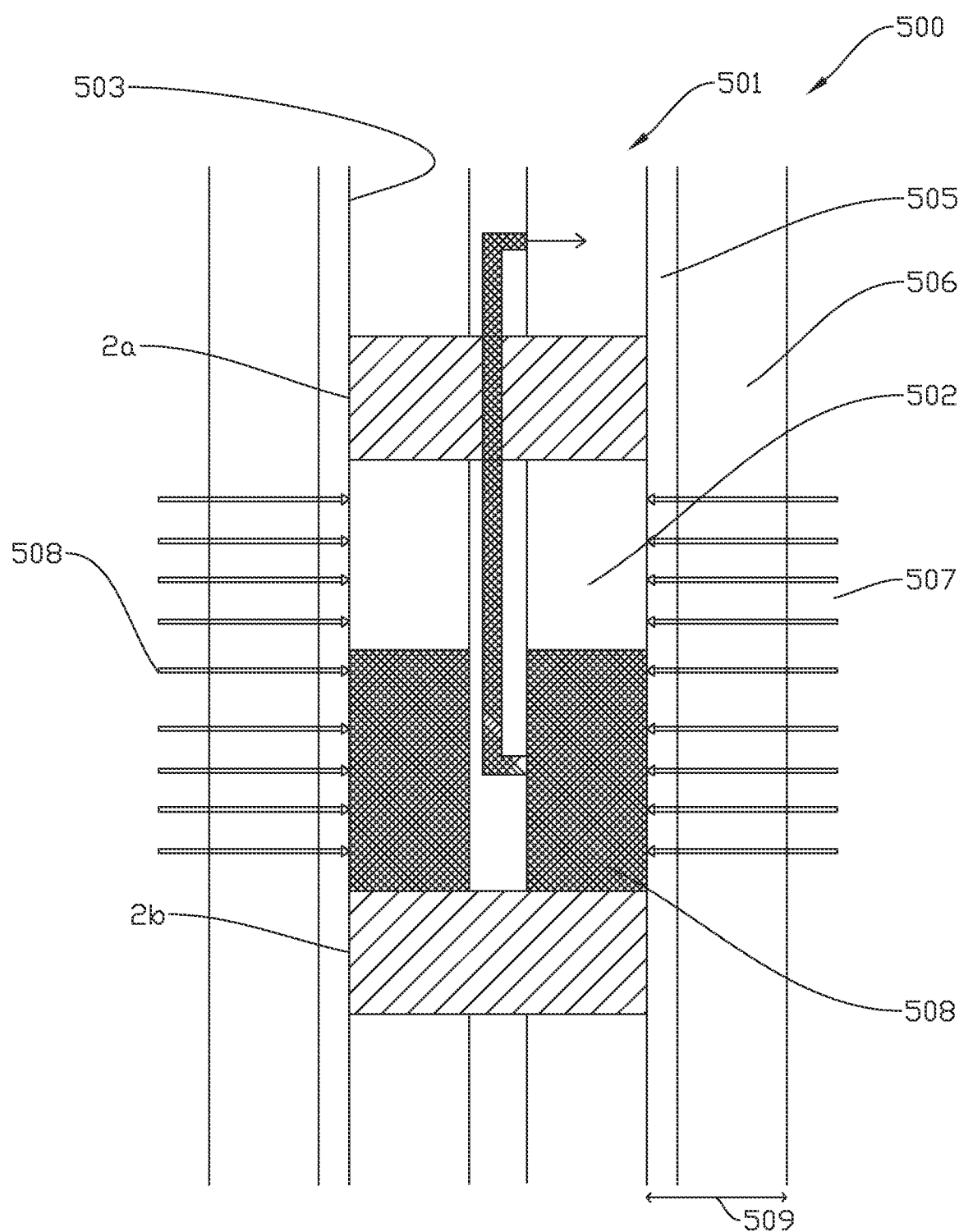
FIG. 8 shows the borehole from FIG. 5 during subsequent fluid sampling when performed by means of a system and method according to the prior art.
Figure 9:
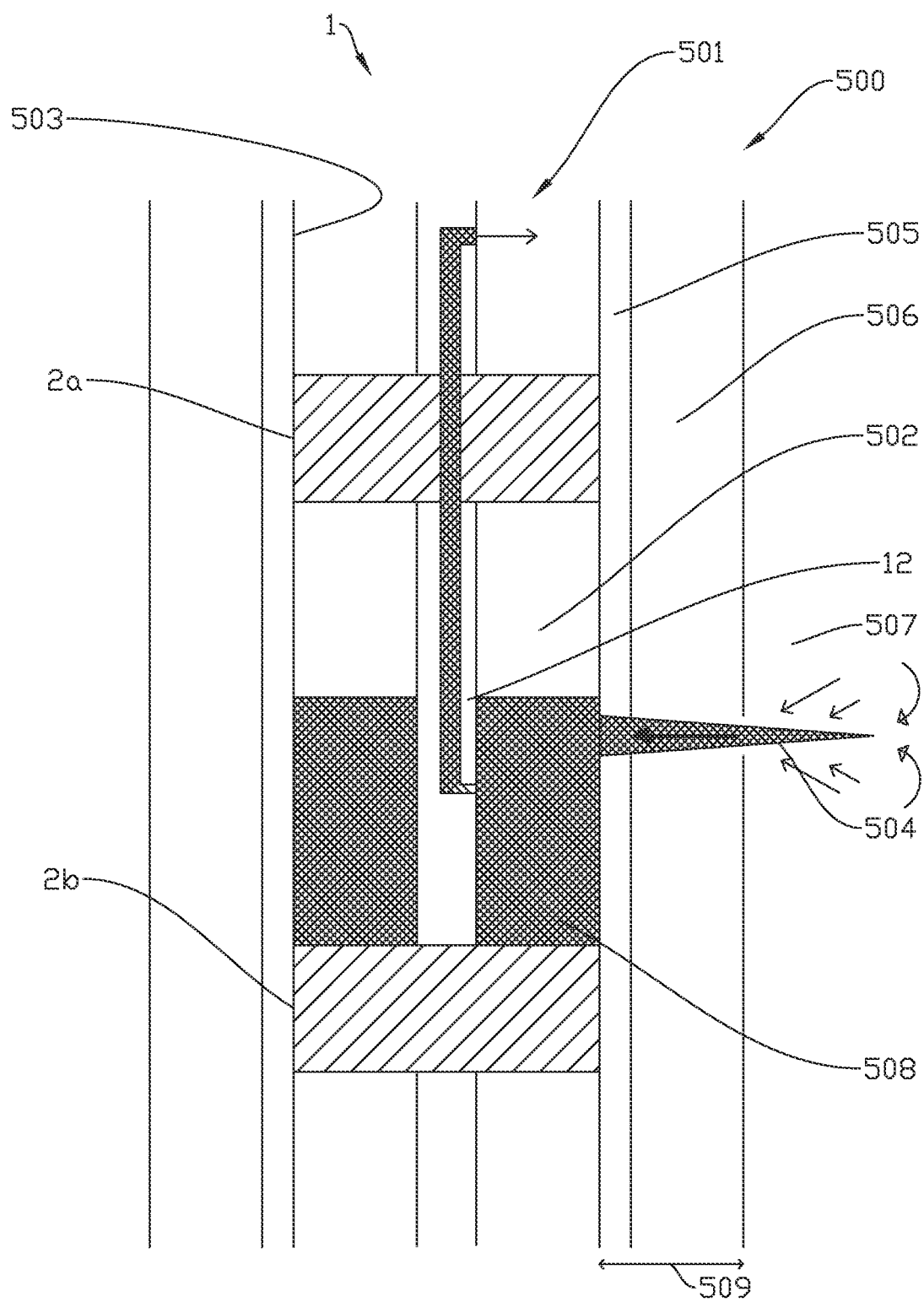
FIG. 9 shows the borehole from FIG. 5 during subsequent fluid sampling when performed by means of a system and method according to the present invention.

Reference will now be made to FIGS. 8-9 wherein an process (i.e. a testing sequence) of openhole formation fluid sampling and/or formation pressure testing of a low-permeability formation 500 is shown, and wherein an openhole formation fluid sampling and/or formation pressure testing process according to the prior art is shown in FIG. 8, while an openhole formation fluid sampling and/or formation pressure testing process according to the present invention is shown in FIG. 9. In the case of the openhole formation fluid sampling and/or formation pressure testing according to the prior art, as indicated in FIG. 8, formation fluid 508 may flow substantially evenly distributed from the formation 500 and into an isolated section 502 between two borehole isolation means 2a, 2b (as indicated by the evenly sized arrows). The formation fluid flows due to an under-balanced pressure condition created within the isolated section 502 by a pump device (not shown). However, since the filtrate zone 506 contains contaminated formation fluid, a relatively large volume of contaminated formation fluid needs to be displaced before sufficiently uncontaminated, virgin formation fluid from the uncontaminated zone 507 of the formation 500 reach the isolated section 502. Further, the process may involve the steps of circulating the formation fluid 508 contained within the isolated section 502 through a fluid contamination and sampling system (not shown) and discarding the contaminated formation fluid into the borehole annulus (above or below 2a or 2b), as indicated by the arrow in FIG. 8, by way of the pump device (not shown), until sufficiently uncontaminated fluid is monitored by a fluid contamination analyser module (not shown), whereby the now acceptably uncontaminated formation fluid 508 is directed to a pressure-tight container (not shown) for storing the formation fluid sample. Following, or prior to, the steps of openhole formation fluid sampling according to prior art, a measurement of a formation pressure of the formation 500 may by way of a pressure sensor (not shown) arranged to be in pressure communication with the formation fluid 508.

The process for openhole formation fluid sampling and/or formation pressure testing according to the prior art may however be a highly time-consuming process due to the large volumes of contaminated formation fluid 508 that needs to be discarded. Also, in the case of sever degree of drilling-induced formation damage, it may not even be possible to conduct the test for formation fluid sampling and/or measure the formation pressure as explained above.

FIG. 9 indicates the process of an openhole formation fluid sampling and/or formation pressure testing in a borehole 501 after a perforation tunnel 504 extending from the borehole wall 503 and into the formation 500 has been excavated by means of a tool assembly 1 and a method according to the present invention. By excavating the perforation tunnel 504, at least partly into the drilling-induce formation damage zone 509, an enhanced fluid/pressure communication may be established between the borehole 501 and the formation 500, which may enable an openhole formation pressure measurement altogether, and/or, as may be the case for an openhole formation fluid sampling process as discussed above, by way of the perforation tunnel 504 creating a preferred path of flow through the drilling-induced formation damage zone 509, the time required to circulate the formation fluid 508 contained within the isolated section 502, through a fluid contamination and sampling system 12 (not shown), to get access to the acceptably uncontaminated formation fluid 508, may be significantly reduced, since a much smaller volume of contaminated fluid, if any, will have to be displaced within the drilling-induced formation damage zone 509.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements.

The mere fact that certain measures are recited in mutually different dependent claims does not indicate that a combination of these measures cannot be used to advantage.

The invention claimed is:

1. A tool assembly for performing a formation stress testing sequence in an openhole section of a borehole, the tool assembly comprising:
   at least two borehole isolation means arranged with an axial distance therebetween for forming an isolated section at the openhole section of the borehole;

a pump device adapted to be in fluid communication with the isolated section, wherein the pump device is configured to alter a pressure within the isolated section;

a pressure sensor arranged for measuring a pressure within the isolated section;

a control unit operably coupled to the pump device and the pressure sensor and configured to control the formation stress testing sequence;

an acoustic shock wave device adapted to generate a series of electrically induced acoustic shock waves and to focus the electrically induced acoustic shock waves onto an area of a wall of the borehole in order to gradually excavate a perforation tunnel from the borehole and into a formation in the propagation direction of the electrically induced acoustic shock waves; and an acoustic shock wave sub for actuating the acoustic shock wave device.

2. The tool assembly according to claim 1, wherein the control unit further comprises a logic unit configured to receive pressure data from the pressure sensor and to automatically control a testing sequence, and based on the information to automatically determine a subterranean formation parameter.

3. The tool assembly according to claim 1, wherein the tool assembly further comprises at least one acoustic transmitter and at least one acoustic receiver for measuring the true inner diameter of a borehole.

4. The tool assembly according to claim 1, wherein the acoustic shock wave device is laterally moveable relative to the tool assembly.

5. The tool assembly according to claim 1, wherein the acoustic shock wave device is at least partially covered by a flexible membrane, and wherein the flexible membrane is formed with an acoustic impedance in the same range as the acoustic impedance of a discharge liquid inside a void of an acoustic shock wave focusing member of the acoustic shock wave device and/or the borehole liquid.

6. The tool assembly according to claim 5, wherein the flexible membrane covers an aperture of the acoustic shock wave device, and wherein the flexible membrane is formed with an acoustic impedance essentially equal to the acoustic impedance of the discharge liquid inside the void of the acoustic shock wave focusing member of the acoustic shock wave device and/or the borehole liquid.

7. The tool assembly according to claim 1, wherein the pump device is adapted to be in hydraulic communication with the at least two borehole isolation means, and wherein the pump device is further configured to controllably engage and disengage the at least two borehole isolation means with the borehole wall.

8. The tool assembly according to claim 1, further comprising at least one additional pressure sensor arranged outside the isolated section for determining a pressure differential in the annulus of the borehole across the borehole isolation means.

9. The tool assembly according to claim 1, further comprising a pressure bleed-off system for controllably reducing of a pressure within the isolated section, wherein the pressure bleed-off system comprises a first port/valve arranged between the borehole isolation means, the first port/valve, when open, being in fluid communication with both the isolated section and a first portion of a housing arranged within the tool assembly, the housing being provided with a piston displaceable within the housing, wherein a second portion of the housing is in hydraulic communication with a second port arranged on the tool assembly outside of the isolated section, the piston separating the first portion and second portion of the housing and the second portion comprising an clean and essentially incompressible liquid, wherein the second port is configured to control a flow of the liquid contained within the second portion.

10. The tool assembly according to claim 1, further comprising a bypass channel configured to create fluid/pressure communication between two sections of the borehole separated by the borehole isolation means and the isolated section.

11. The tool assembly according to claim 1, further comprising a rotatable connection means for an axial rotation of an acoustic shock wave device module relative to a remainder of the tool assembly.

12. The tool assembly according to claim 1, further comprising a fluid contamination and sampling system in selective fluid communication with the isolated section, the fluid contamination and sampling system comprising a fluid contamination analyzer circuit comprising a valve and a fluid contamination analyzer module, the fluid contamination and sampling system further comprising another set of valves and a pressure-tight container for storing a formation fluid sample.

13. The tool assembly according to claim 1, further comprising a directional sensor unit configured to measure an orientation of the tool assembly in a horizontal plane and an inclination in a vertical plane.

14. The tool assembly according to claim 1, wherein the acoustic shock wave device is located between the borehole isolation means.

15. A method for performing formation stress testing in an openhole section of a bore-hole using a tool assembly, wherein the tool assembly comprises at least two borehole isolation means, a pump device and a pressure sensor arranged for measuring a pressure within an isolated section to be formed between the two borehole isolation means, the method comprising the steps of:

positioning the tool assembly at a desired section of the borehole;

forming the isolated section by means of the borehole isolation means;

operating the pump device to alter the pressure within the isolated section in accordance with a testing sequence;

collecting data from the pressure sensor between the bore-hole isolation means; and using the data collected from the pressure sensor to determine a subterranean formation parameter, wherein the tool assembly further comprises an acoustic shock wave device and an acoustic shock wave sub for actuating the acoustic shock wave device and wherein the method further comprises the step of:

gradually excavating a perforation tunnel from the borehole and into the formation in a propagation direction of acoustic waves, generated via a series of the acoustic shock waves focused onto a wall of the borehole and electrically induced by way of the acoustic shock wave device;

or locating an already excavated perforation tunnel.

16. The method according to claim 15, wherein the tool assembly further comprises a fluid contamination and sampling system in selective fluid communication with the isolated section, wherein the method further comprises the steps of:

opening a valve to establish a fluid communication between the isolated section and a fluid contamination analyzer circuit;

operating the pump device to create an underbalanced pressure condition within the isolated section; and when analyses show contamination at an acceptable level, opening valves for collecting a formation fluid sample and storing the sample in a pressure-tight container.

17. The method according to claim 15, wherein the method further comprises the steps of:
performing an openhole pressure transient test by operating the pump device in accordance with a testing sequence while simultaneously measuring the pressure within the isolated section in order to determine a subterranean formation property such as:
effective permeability; and
formation deliverability.

* * * * *